United States Patent [19]

Foster et al.

[11] 4,029,161

[45] June 14, 1977

[54] DIGITAL SCALE

[75] Inventors: Colin E. Foster, Bensenville; Edward C. Karp, Belvidere, both of Ill.

[73] Assignee: Sanitary Scale Company, Belvidere, Ill.

[22] Filed: Sept. 4, 1975

[21] Appl. No.: 610,170

Related U.S. Application Data

[63] Continuation-in-part of Ser. No. 564,416, April 2, 1975, abandoned.

[52] U.S. Cl. .................................. 177/25; 177/3; 177/DIG. 3; 235/151.33
[51] Int. Cl.² ............... G01G 19/413; G01G 23/18
[58] Field of Search ................. 177/3, 4, 5, 6, 25, 177/DIG. 1, DIG. 3, 15; 235/151.33; 61 PS, 58 PS

[56] References Cited

UNITED STATES PATENTS

| | | | |
|---|---|---|---|
| 3,108,648 | 10/1963 | Williams | 177/3 |
| 3,170,624 | 2/1965 | Allen | 177/3 X |
| 3,262,639 | 7/1966 | Karp | 177/3 X |
| 3,740,536 | 6/1973 | Takahashi | 177/25 X |
| 3,869,005 | 3/1975 | Williams | 177/25 |

*Primary Examiner*—Joseph W. Hartary

[57] ABSTRACT

The disclosure relates to a weighing and computing system for determining and displaying the total net price of a series of commodity items including items to be weighed for determining individual net prices from unit weight prices and items of fixed net prices which are not to be weighed. The system includes a weighing mechanism comprising a platform upon which a commodity item to be weighed is placed for providing reference and gross weight signals corresponding to the load on the platform with the reference weight signals corresponding to the total load of all previous commodities in the series which have been weighed and the gross weight signals corresponding to the total load of all said previous commodities weighed and the load of the next commodity in the series to be weighed and a selectively operable unit price means for providing a rate signal corresponding to a unit weight price for a commodity to be weighed or an item net price signal for a commodity of fixed net price. The system also includes a computer comprising reference weight memory means for storing reference weight signals developed by the weighing mechanism, subtracting means for determining the difference between the gross weight signals and the reference weight signals to provide a net weight for each commodity to be weighed, multiplying means responsive to the weight difference determination for multiplying each net weight by a corresponding rate signal for providing a net price for each of the weighed commodities and net price accumulating means for accumulating all of the net prices. The system further includes a display coupled to the net price accumulator for displaying the sum total of the net prices.

In a preferred form, the system determines a plurality of average net weights during perdetermined time intervals until two consecutive average net weights are the same. At such times the system computes the net price of the commodity being weighed.

33 Claims, 13 Drawing Figures

DIGITAL SCALE

RELATED APPLICATION

This application is a continuation-in-part of application Ser. No. 564,416 filed Apr. 2, 1975, now abandoned, and assigned to the assignee of this application.

BACKGROUND OF THE INVENTION

The present invention relates to a weighing and computing system of the type which determines a net weight and net price for each commodity in a series of commodities to be weighed and a total net price for the entire series of commodities. The present invention is more particularly directed to a digital weighing and computing system which differentiates between items to be weighed and items of fixed net price which are not to be weighed for providing a total net price for the entire series of commodities which includes the items to be weighed and items of fixed net price which are not to be weighed.

Automatic weighing, price computing and price registering systems are well known. Such a system is fully disclosed and claimed in Karp, U.S. Pat. No. 3,262,639 which issued July 26, 1966 and which is assigned to the assignee of the present invention. The system there disclosed is one which includes an optical angular shaft position encoder which provides a signal indicative of the load placed onto the weighing platform of the weighing mechanism and which additionally registers for storing the tare weight of packaging material and the gross weight of a commodity and its package. The system disclosed in the aforementioned patent additionally includes a subtractor for determining the difference between the gross weight and tare weight to provide a net weight of the commodity and a multiplier for multiplying the net weight by a unit weight price for determining the net price of the commodity.

Like other weighing and computing systems which have come before, the system disclosed in U.S. Patent No. 3,262,639 is incapable of providing a total price for a sum of commodities to be weighed and in so doing, allowing each previously weighed commodity of the series to remain on the weighing mechanism platform as subsequent commodities are weighed. In commercial weighing operations, and particularly in retail food operations, a customer may wish to purchase more than one commodity item. In this environment, considerable time would be lost if each item had to be weighed separately for determining a net weight and then computing a total net price on another computing system. Also, in the retail food environment, a customer may wish to not only purchase a number of commodity items which must be weighed in determining a net price for each, but additionally items of fixed net price. Prior weighing and computing systems have been incapable of differentiating between commodities to be weighed and commodities of fixed net price not to be weighed rendering them unsuitable for the computing of a total net price for all of the commodities to be weighed and those of fixed net prices.

Retail food store owners in the past, when serving a customer purchasing a plurality of items to be weighed and one or more items of fixed net price have had to determine a net weight and price separately for each commodity item to be weighed and then to total the prices of all of the commodity items including those which have been weighed and those of fixed net price on a separate computing mechanism such as a cash register. Obviously, this requires a significant number of operational steps which can cause consumers considerable waiting time for a total net price to be computer and long lines at the counter.

Prior art weighing and computing systems of the digital type have other deficiencies in addition to those previously discussed. Prior art digital scales display the instantaneous weight of the item being weighed continuously while the weighing mechanism is coming to rest. The weights are displayed at such a rapid rate that the human eye cannot distinguish between successive displayed weights until the scale has come to rest. This can be confusing and disturbing to both the user and the customer. Additionally, in retail food operations the weighing and computing systems may be located on or near a refrigerator or other vibrating device causing the displayed weight to change continuously even after the scale platform has nominally come to rest. Prior art weighing and computing digital systems continuously compute net price, not only resulting in the displayed net weight changing but additionally in the net prices changing. This can cause embarrassment to merchants and also cause consumers to believe that the price that they are paying may be incorrect.

It is therefore a general object of the present invention to provide a weighing and computing system which determines a net weight and net price for each commodity in a series of commodities to be weighed and a total net price for the entire series of commodities weighed.

It is also a general object of the present invention to provide a digital weighing and computing system of the type which determines a net weight and net price for each commodity to be weighed in a series of commodities and a total net price for an entire series of commodities which includes commodity items to be weighed and commodity items of fixed net price which are not to be weighed.

It is a still further object of the present invention to provide a digital weighing and computing system which displays the net weight of a commodity being weighed at periodic intervals such that each net weight displayed is individually discernible.

It is a still further object of the present invention to provide a digital weighing and computing system which displays a relatively continuous and unchanging net weight and net price for each commodity item weighed once the weighing mechanism platform has nominally come to rest.

It is a still further object of the present invention to provide a digital weighing and computing system which computes average net weights during predetermined time intervals to thereby accelerate the final net weight determination and to render the system less sensitive to minor external vibrations.

SUMMARY OF THE INVENTION

The present invention provides a weighing and computing system of the type which determines a net weight and net price for each commodity in a series of commodities to be weighed and a total net price for the entire series of commodities comprising a weighing mechansim including a platform upon which a commodity to be weighed is placed for providing reference and gross weight signals responsive to the load on the platform, unit price means selectively operable for providing a rate signal corresponding to a unit weight price for each commodity to be weighed, reference weight memory means for storing the reference weight signals developed by the weighing mechanism, the reference weight signals corresponding to the total load of all previous commodities in the series which have been weighed, gross weight memory means responsive to the gross weight signals developed by the weighing mechanism for storing the gross weight signals, the gross weight signals corresponding to the total load of all the previous commodities and the load of the next commodity in the series placed on the platform and means for determining the difference between the gross weight signals and the reference weight signals to provide a net weight for each commodity in the series of commodities. The weighing and computing system of the present invention also comprises means for multiplying a net weight by the rate signals for providiing a net price for each of the commodities in the series, net price accumulating means for accumulating the net prices and display means coupled to the net price accumulating means for displaying the sum total of the net prices.

The present invention also provides a weighing and computing system for determining a net weight and net price for each commodity to be weighed in a series of commodity items which includes items to be weighed and items of fixed net price which are not to be weighed and for determining the total net price of all of the commodities in the series of items. The weighing and computing system comprises a weighing mechanism including a platform upon which a commodity item to be weighed is placed for providing reference and gross weight signals responsive to the load on the platform, unit price means selectively operable for providing a rate signal corresponding to a unit weight price for a commodity to be weighed, an item net price signal for a commodity of fixed net price and reference weight memory means for storing the reference weight signals developed by the weighing mechanism, the reference weight signals corresponding to the total load of all previous commodities in the series which have been weighed. The system additionally comprises a gross weight memory means responsive to the gross weight signals developed by the weighing mechanism for storing the gross weight signals, the gross weight signals corresponding to the total load of all the previous commodities weighed and the load of the next commodity in the series to be weighed, means for determing the difference between the gross weight signals and the reference weight signals to provide a net weight for each commodity to be weighed in the series of commodities, means responsive to the weight difference determination for multiplying the net weight by the rate signals for providing a net price for each of the commodity items weighed in the series, net price accumulating means for accumulating the net prices, and display means coupled to the net price accumulating means for displaying the sum total of the next prices.

The invention still further provides a weighing and computing system of the type which determines a net weight and net price for a commodity to be weighed. It comprises a weighing mechanism including a platform upon which commodities to be weighed are placed for providing a reference weight signal and periodically occurring gross weight signals responsive to the load on the platform, unit price means selectively operable for providing a rate signal corresponding to the unit weight price for the commodity to be weighed, reference weight memory means for storing the reference weight signals developed by the weighing mechanism, and gross weight memory means responsive to the gross weight signals developed by the weighing mechanism for accumulating the periodic gross weight signals during predetermined time intervals. The system also includes means for dividing the accumulated gross weight signals by the number of gross weight signals accumulated during each of the predetermined time intervals for providing average gross weight signals spaced apart in time by the predetermined time intervals, means for determining the difference between the average gross weight signals and the reference weight signals to provide net weight signals, final net weight detecting means responsive to the net weight signals for detecting when a predetermined number of the net weight signals represent the same net weight as a final net weight, means responsive to the final net weight detecting means for multiplying the final net weight by the rate signal for providing a net price of the commodity, and display means coupled to the multiplying means for displaying the net price of the commodity.

BRIEF DESCRIPTION OF THE DRAWINGS

The invention, together with the object and advantages thereof, may best be understood by reference to the following description taken in conjunction with the accompanying drawings, and in the several figures of which like reference numerals identify like elements, and in which.

DESCRIPTION OF THE PREFERRED EMBODIMENT

Figure 1:
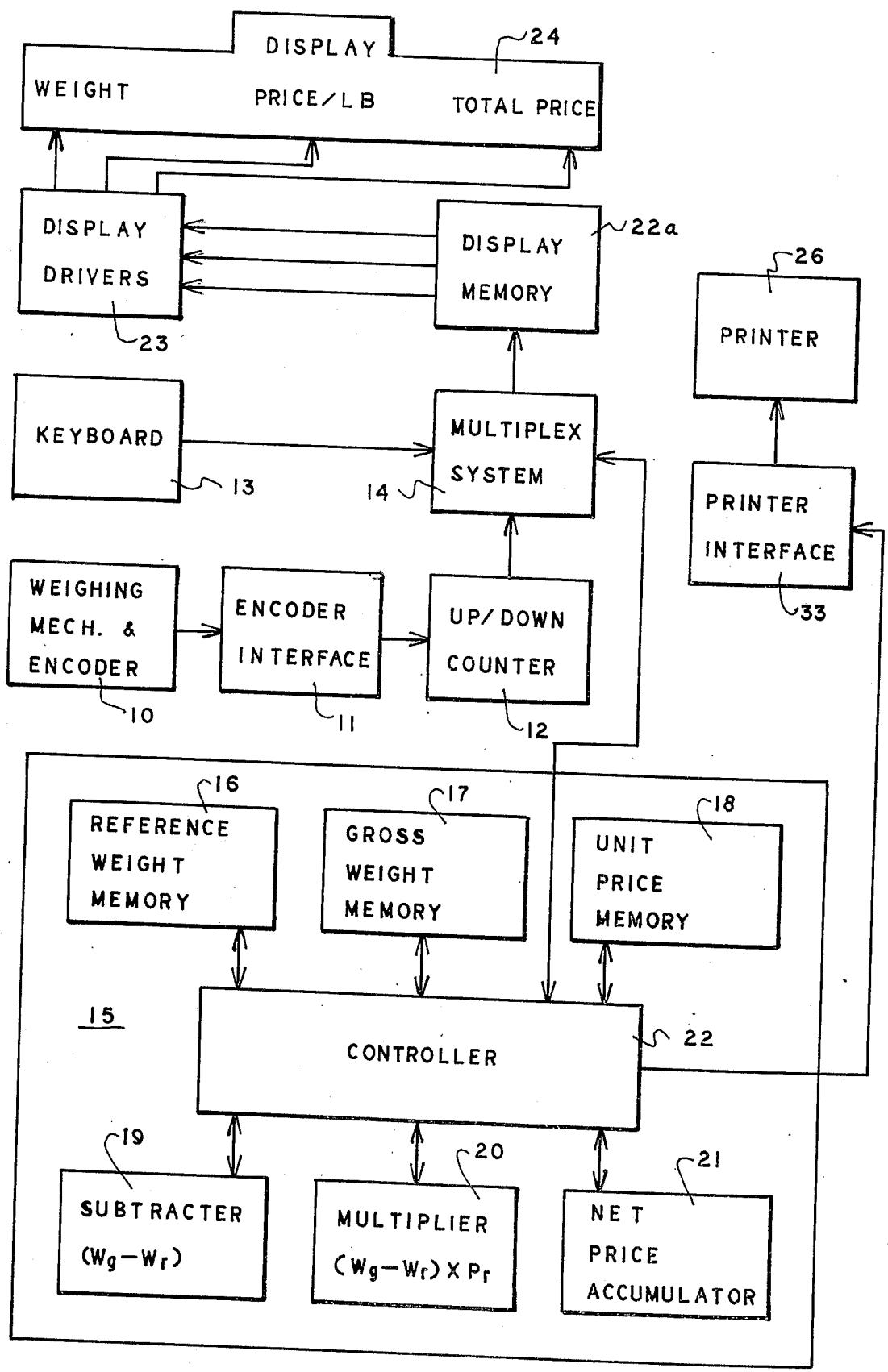
FIG. 1 is a block diagram of a weighing and computing system embodying the present invention.

Referring now to FIG. 1, there is shown a block diagram of a weighing and computing system embodying the present invention. It comprises a weighing mechanism and encoder 10, an encoder interface 11, and up/down counter 12, a keyboard 13 and a multiplex system 14. The weighing and computing system of FIG.

1 additionally includes a computer 15 which includes a reference weight memory 16, a gross weight memory 17, a unit price memory 18, a subtracter 19, a multiplier 20, a net price accumulator 21 and a controller 22. The weighing and computer system further comprises a display memory 22, display drivers 23, a display 24, a printed interface 33 and a printer 26.

The weighing mechanism and encoder 10 is coupled to the encoder interface 11 which interfaces the weighing mechanism and encoder to the up/down counter 12. Briefly, the weighing mechanism and encoder 10 includes a weighing platform which is coupled to an encoder comprising a reticle assembly having a plurality of opaque and light transmissive areas, which in conjunction with a light source on one side of the reticle and a pair of sensors on the other side of the reticle provides a pair of essentially sinusoidal signals which are 90° out of phase. The pair of sinusoidal signals are applied to a threshold detector to obtain a pair of square wave pulse trains which are 90° out of phase with each other.

The pair of square wave pulse trains are applied to the encoder interface 11 which includes logic circuitry for generating a pulse whenever one of the square waves makes a transition. The logic within the encoder interface determines from the condition of the square waves at any point in time along with the particular transition monitored to determine if the weighing mechanism platform is moving in the upward or downward direction. If a transition occurs and the platform is moving in the downward direction, indicating increasing weight, the encoder interface will provide an up pulse and if the platform is moving in the upward direction, indicating decreasing weight, the encoder interface will provide a down pulse. Because the sinusoidal outputs derived from the weighing mechanism and encoder are 90° out of phase, as the reticle is displaced by a distance equal to the distance between adjacent transmissive areas four counting pulses will be provided by the encoder interface 11. This is commonly referred to as "four times" logic and is well known in the art. A preferred weighing mechanism and encoder, and encoder interface will be described in detail hereinafter.

The up/down counter 12 is coupled to the encoder interface 11 and receives therefrom the up and down pulses. After a commodity item to be weighed is placed on the weighing mechanism platform, the platform moves up and down in damped oscillatory motion until it comes to rest. Prior to the scale platform coming to rest, the up/down counter counts up one count for each up pulse and counts down one count for each down pulse so that when the platform comes to rest the number of counts in counter 12 is representative of the total load on the weighing mechanism platform.

Figure 2:
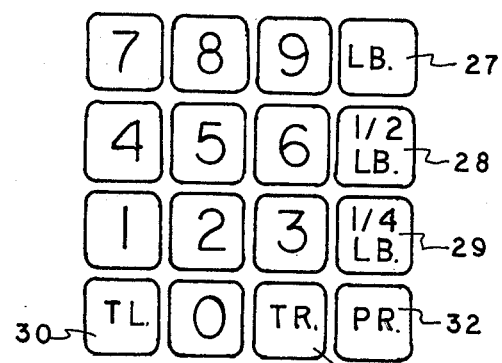
FIG. 2 is a graphical representation of a preferred form of a keyboard which may be utilized in practicing the present invention.

Keyboard 13 comprises a four by four matrix of 16 keys which are utilized by an operator in operating the weighing and computing system. A preferred form of the keyboard 13 is shown in FIG. 2. Ten of the keys, 0-9 are utilized and selectively operable for providing rate signals corresponding to a unit weight price for a commodity to be weighed, an item net price signal for a commodity of fixed net price, or a tare weight signal representing a known tare weight. Keys 27, 28 and 29 are utilized for identifying whether the unit weight price selected corresponds to a price per pound, a price per half pound, or a price per quarter pound respectively. Key 30 is utilized for computing and displaying a total net price and for clearing the net price accumulator and the unit price memory. It also will cause the printer to print the total net price if there is a printer connected to the system.

Key 31 when depressed causes the weighing and computing system to store in reference weight memory 16 in a reference or tare weight corresponding to the total load on the platform such as the tare weights of meat commodity boats and wrappers and/or the total net weights of previously weighed commodities. The subtractor 19 of computer 15 will thereupon subtract the reference weight from the displayed weight stored in the gross weight memory to cause the display to indicate zero weight. If the weighing mechanism is at absolute zero (nothing on the platform) and tare key 31 is depressed, an operator may then enter a known tare or reference weight into the reference weight memory 16 by depressing the appropriate keys labeled 0-9. For example, if the known tare weight is 0.15 lbs., the operator will depress the "1" key and then the "5" key. An interdigit timer is associated with the keyboard and requires that successive keys (0-9) be depressed within a fixed period of time (one-third of a second for example). Should the timer time out after a key is depressed and if an improper tare weight is entered, the tare key 31 must once again be depressed and the correct tare weight entered. The entered tare weight is stored in reference weight memory 16 and then subtracted by subtracter 19 from the zero weight to cause the display to display the tare weight entered as a negative number. When the commodity and tare are thereafter weighed, the tare weight will be compensated for resulting in a net weight being displayed.

The print key 32 when depressed enters the net price of a item into the net price accumulator 21. It may also be utilized for exacting a subtotal of all net prices if the operator depresses the tare key 31 first to zero the weight display or if the gross weight happens to be at zero.

The reference weight memory 16, gross weight memory 17, unit price memory 18, subtractor 19, multiplier 20 and net price accumulator 21 are all coupled to the controller 22 of computer 15. As the directions of the arrows indicate, data flows in both directions from the controller to each of these peripheral units and back again. To transfer data from one of the peripheral units to another, the data must be conveyed through the controller 22. In essence, controller 22 controls all of the functions of the computer and acts as a central processing unit.

The controller obtains the weight from up/down counter 12 and the keyboard data from keyboard 13 via the multiplex system 14. The controller 22 of computer 15 at periodic intervals sets up system addresses which correspond to the locations where data is to be sent to or acquired from. These addresses may correspond to the address of the reference weight memory 16, gross weight memory 17, or any of the other peripheral units of the computer. To acquire data from either the counter 12 or keyboard 13, the controller will establish predetermined addresses to the multiplex system 14 to condition the counter 12 or keyboard 13 to convey to the controller via the multiplex system 14 the data required.

The printer interface 33 obtains the data to be printed directly from the controller 22. The printer interface 33 organizes the data to be printed in columns corresponding to each digit of the net weight, price per unit weight and total price and conveys the same to the printer 26.

The display 24 obtains its data for display purposes via the multiplex system 14. The data to be displayed is conveyed from the controller 22 after it addresses the display memory 22 through the multiplex system 14. The display memory 22 contains a four-bit memory and decoder for each digit of the display. Each digit of the display preferably comprises a lamp having seven segments or elements arranged for displaying any number from zero through 9 depending upon the particular elements illuminated. The decoder in the display memory obtains from the computer, for each digit, a four-bit binary word representing the decimal value and decodes it into a seven-segment decimal. Each seven-segment decimal is applied to the display drivers 23. Display drivers 23 comprises a seven-segment driver for each digit lamp of the display and causes each digit to display the appropriate number in accordance with the seven digit decimal obtained from the display memory decoder.

The weighing and computing system of the present invention is capable of obtaining a net weight and net price for each commodity item to be weighed in a series of commodities and additionally is capable of displaying the total price of the entire series of commodities which includes commodity items to be weighed for determining their individual net prices, and items having fixed net prices. The weighing and computing system of the present invention is further capable of providing a subtotal net price without disturbing its ability to provide a total net price and additionally precludes price manipulation by locking out further unit weight price entries.

In operation, assuming that an operator is to determine a total net price for five items including three items to be weighed for obtaining a net price for each and two fixed net price items, the initial wrapping materials will first be placed onto the weighing platform. The system will then display the weight of the wrapping paper. The operator then depresses the tare key 31 which causes the displayed weight to return to zero and the weight of the wrapping material or tare weight to be stored in the reference weight memory 16 of computer 15. The operator then places the commodity to be weighed into the wrapping materials. The unit weight price measure is then entered by first depressing the appropriate keys (0–9) of the keyboard representing the unit weight price and then either of the keys 28 or 29 unless the unit weight price is based on a per pound basis. The computing system will assume a unit weight price based on a per pound basis unless either key 28 or 29 is depressed. For example, assuming the first commodity to be weighed is a beef roast having a unit price of $1.69 per one-half pound, the operator will first depress the number "1" key, the number "6" key and the number "9" key and then key 28. If the price is $1.69 per pound, the operator need not depress any of the keys 27, 28, or 29. An interdigit timer within computer 15 requires that successive price keys be depressed within a predetermined time period such as one-fourth of a second. Should the time time out following a key depression, the previous entry will be cleared and the next key depression will be used as the first character of a new price entry. Thus the price entry is also self-clearing. The timing out of the interdigit timer is easily detected by the operator because the unit price is displayed on the display as each key is depressed. As the operator enters the unit weight price the controller 22 is continuously addressing all of the system to gather data. Recognizing that the controller addresses each location a number of times a second, as each key on the keyboard is depressed it is entered into the unit price memory 18.

Now, because a unit weight price of $1.69 per lb. has been entered and the reference weight has been stored, the operator places the beef roast and wrapping materials onto the weighing platform. As the weighing platform comes to rest, in damped oscillatory motion the weight displayed on the display 24 represents the instantaneous net weight because the subtracter 19 is continuously subtracting the reference weight stored in reference weight memory 16 from the updated gross weight in gross weight memory 17. As the controller 22 accesses the counter 12 for gross weight data, the instantaneous gross weight data is conveyed to the controller and then to the gross weight memory 17 where it is temporarily stored updated, and used by the subtracter 19 for determining the instantaneous difference between the gross weight obtained from the gross weight memory 17 and the reference weight obtained from the reference weight memory 16. The difference between the instantaneous gross weight and the reference weight is then transmitted via the controller to the multiplex system 14, to the display memory 22, display drivers 23 and then to the display 24 to be displayed as net weight. The instantaneous net weight is being continuously determined at such a rapid rate that if each such determination were displayed at the determination rate, the human eye would not be capable of discerning one displayed weight from the next. To eliminate the problem, the computer includes a blanking means which allows the net weights to be displayed at a rate less than the rate of the determinations. In a preferred form, the blanking means of the computer allows the weight to be displayed at a rate of three times a second so long as the weight is changing. This allows the human eye to discern each displayed weight.

The computer also includes means for detecting when two successive net weight determinations are the same net weight. When two net weight determinations are the same, the platform is considered to be nominally at rest, and the weight displayed on the display 24 represents the net weight of the beef roast. At this time the net price is automatically computed. Assuming that the beef roast weighed two pounds, the display will show 2.00 for the net weight, $1.69 for the unit weight price and $3.38 for the net price. In computing the net price, the net weight in subtractor 19 and the unit weight price stored in unit price memory 18 are conveyed via the controller 22 to the multiplier 20 wherein the net weight is multiplied by the unit weight price for determining the net price of the item, in this case the beef roast. The decimal value of each digit of the computed net price will be conveyed by the controller to the multiplex system 14 in the form of a four-bit binary word and then to the display memory 22 where each four-bit binary word is decoded into the seven-segment decimal and then to the display drivers 23, and display 24. Upon the depression of the print key 32, the net price of the beef roast will be stored in the net price accumulator 21 and printed if there is a printer associated with the system.

Once the net price is computed, further unit price entry is locked out by price locking means in the computer. Only after the tare key is depressed or all commodities are removed to zero the display can a new unit price be entered. However, the displayed weight may still vary should the platform be caused to move. If the platform does move a new net price will automatically be computed but only after the net weight determination is the same two times in succession. Also, to avoid annoying rapid changing in the displayed price due to a slight vibrating of the weighing mechanism support surface, at a transition point resulting in alternate up and down pulses, only the higher weight and price is displayed. Since this process occurs at reference zero and at tare entry in the same manner, net weight is yet correctly determined and displayed. Thus, displayed weight and price will still be accurate but annoying and indeterminant flickering in the displayed weight and price is avoided.

The operator in weighing the subsequent items will repeat this procedure but need not remove the previously weighed commodities from the platform. For example, when the operator proceeds to weigh the second item in the series to be weighed, the wrapping paper for the second item is placed on the scale and the tare key 31 is depressed to store a new reference weight in the reference weight memory 16. The new reference weight in the reference weight memory 16 will correspond to the total load on the platform previous to the placing on the platform of the next or second commodity. Thus, in repeating the above procedure for each of the commodities to be weighed in the series of commodities the gross weight stored in the gross weight memory will correspond to the total load on the platform and the net weight of the next commodity in the series to be weighed. The subtracter 19 in subtracting the gross weight from the reference weight will therefore provide, when the scale platform comes to rest, the net weight of each commodity in the series. The operator in having entered the new unit weight price for each commodity will cause the net weight of each commodity to be multiplied by its corresponding unit weight price to provide a net price for each commodity. Each net price is automatically displayed on display 24 and stored in the net price accumulator 21 when print key 32 is depressed.

The unit price of any item may be entered at any time, even after the weighing platform has nominally come to rest. However, any item net price will not be computed until a unit price is entered. If the unit price is entered after the platform has nominally come to rest, it cannot thereafter be changed for once a unit price is entered and the platform has come to rest, further price entries are locked out. The pound, quarter or half pound unit entries (like the digital price entry) is cleared upon the completion of a weighing computation and return to zero.

When the operator wishes to enter a commodity of fixed net price which is not to be weighed, the operator merely enters the price of the fixed net price commodity on the keyboard as though it were the unit weight price but instead will be an item net price. Since this commodity is not to be weighed, the operator then depresses the print key 32. The computer includes means for detecting when there is no difference between the reference weight, stored in the reference weight memory 16, and the gross weight stored in the gross weight memory 17 or when the scale is at absolute zero. If either of these two conditions exist, the price entry will be treated as an item entry which does not require a unit weight price and will merely cause the entered price to be displayed as an item net price. It will be stored in the net price accumulator when print key 32 is depressed. Because this entry is for an item of fixed net price and not one which is to be weighed, the weight display will be blanked out to avoid confusion.

Once the operator has entered the net price of each commodity of the series of commodities into the net price accumulator 21, the total key 30 is depressed which causes the total net price in the net price accumulator 21 to be transferred from the controller to the multiplex system 14 and then to the display memory, display drivers and finally to the display to be displayed. The depressing of the total key clears the system and causes only the total net price to be displayed. A lamp associated with the total key illuminates indicating that the price displayed is a total price.

If at any time the operator requires a subtotal price, it may be obtained with a zero unit price, and zeroing the weight display by depressing the tare key 31 or returning the scale to absolute zero, and depressing the print key 32. The subtotal price stored in the net price accumulator will thereupon be displayed without clearing the net price accumulator.

In a preferred form, the computer 15 may be equipped with the capacity to count the number of items which have been entered during a transaction. This may be accomplished by sensing each time the item key 30 is depressed (except when obtaining subtotal net prices) and then displaying the total number of items in the transaction on the display 24.

After a weighing series has been completed and all of the weighed commodities have been removed from the platform, the platform will return to absolute zero. This causes the up/down counter to return to zero. The computer thereupon detects the zero count in the counter and clears the reference weight memory if the reference weight had been entered and if the tare weight has been used to compute a net weight greater than zero and also clears the unit price memory if the unit price has been used to compute a net price. Also as a result of the zero count detection, the display will clear.

Now that the weighing and computing system has been generally described, it will be described in greater detail by making reference to FIGS. 3 through 13.

Figure 3:
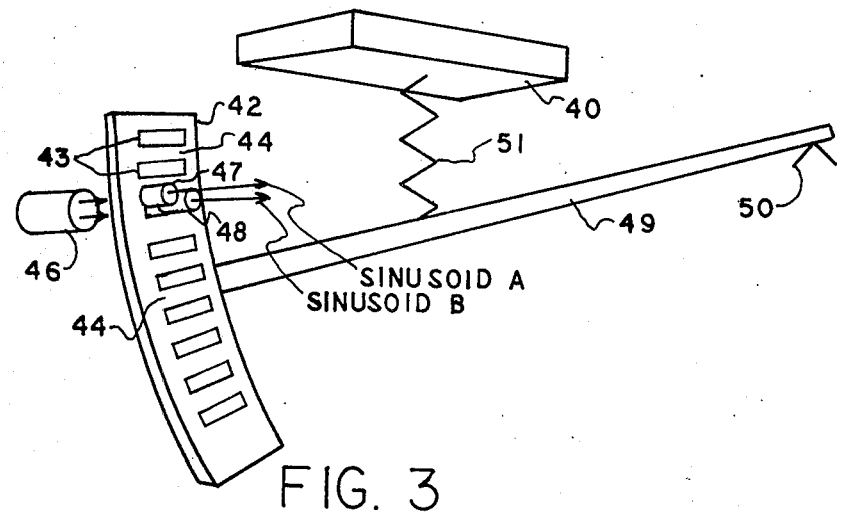
FIG. 3 is a perspective representation of a preferred weighing mechanism which may be utilized in practicing the present invention.

Referring to FIG. 3, there is shown a perspective representation of a preferred weighing platform 40 and reticle encoder assembly 41 which may be utilized in practicing the digital weighing and computing system of the present invention. The reticle assembly 41 comprises a reticle 42 having a plurality of transmissive areas 43, a light source 46 and first and second sensors 47 and 48 on the side of the reticle opposite the light source. The reticle assembly has lever arm 49 pivotably mounted at point 50 to impart arcuate movement or displacement to the reticle 42. The lever arm 49 is coupled to the weighing platform 40 by linkage 51 to thereby displace the reticle by an amount proportional to the displacement of the weighing platform and ultimately the weight of the load placed onto the weighing platform.

Sensors 47 and 48 are aligned relative to the light transmissive and opaque areas and to the light source 46 to provide first and second outputs which approximate sinusoids, sinusoid A and sinusoid B. When sinusoid A and B are not "true" sinusoids, they are close enough to being truly sinusoidal for purposes of this preferred embodiment to be considered as such and will therefore hereinafter be referred to as sinusoids. Sinusoid A is generated by light sensor 47 and sinusoid B is generated by light sensor 48. The light sensors are spaced apart by one-fourth the distance between adjacent transmissive areas resulting in sinusoid A and sinusoid B being 90° out of phase with each other.

Figure 4:
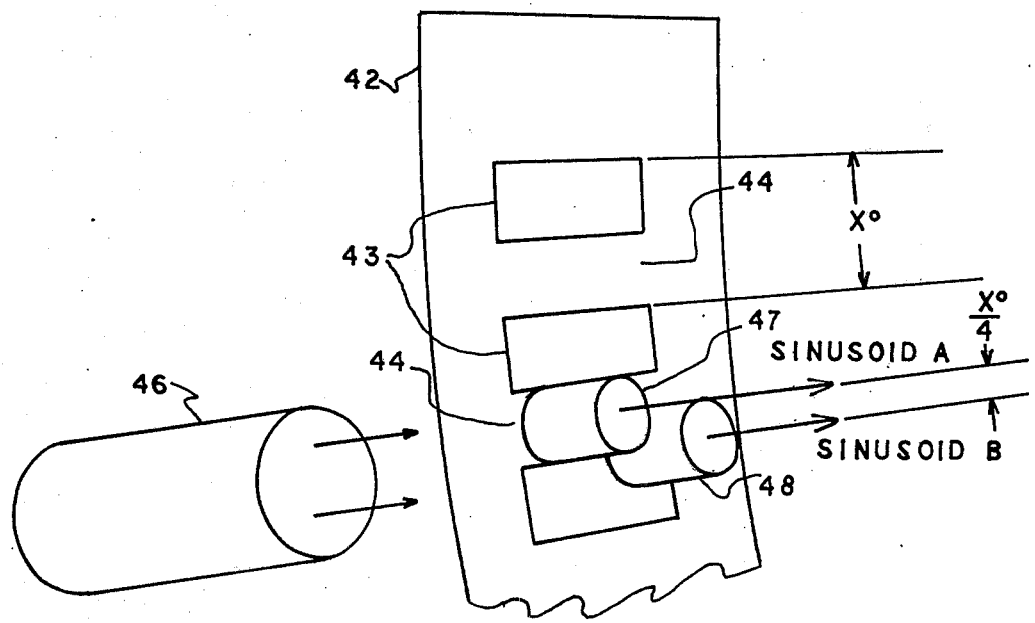
FIG. 4 is an explosed partial view of a portion of the weighing mechanism of FIG. 3.

FIG. 4 shows the reticle and associated light source and light sensors in greater detail. The light transmissive areas 43 and opaque areas 44 are of equal width which approximates the relative magnitude of the diameters of the light sensors 47 and 48. This assures that the outputs of the light sensors are a close approximation to a sinusoidal signal. In addition to the two tare compensating provisions previously discussed, the weighing and computing system may additionally be provided with a manual tare adjustment to displace or bias platform 40 by an amount representative of a known tare. This can be accomplished by suitable mechanical means adjustable by a knob. Such tare compensation is well known in the art.

Two additional tracks may preferably be added to the reticle assembly of FIGS. 3 and 4 which have not been shown in those figures. The first additional track, or second track, includes a single light opaque area which is located on the reticle and in appropriate spaced relation from a corresponding light source and absolute zero light sensor for sensing when the scale platform is at absolute zero. The absolute zero sensor associated with the second track senses when the platform is at absolute zero for cyclically resynchronizing the occurrence of the up and down pulses to the counter with the position of the weighing platform (should count error even occur) and also applies a signal to an absolute zero detector for illuminating the displays when power is first applied to the system. The other additional track, or third track, preferably includes a pair of light opaque areas located at the extreme ends of the reticle assembly so that a corresponding light source and light sensor generates a signal indicating when the maximum limits of the scale have been reached. These end of limits signals may be used to notify an operator that there is too much of a load on the weighing scale platform at the upper end limit or that at the lower end limit the scale has been exceeded. The lower end limit may correspond to a negative weight of one-half pound and the upper end limit may correspond to a positive weight of 25 pounds.

Figures 5, 6:
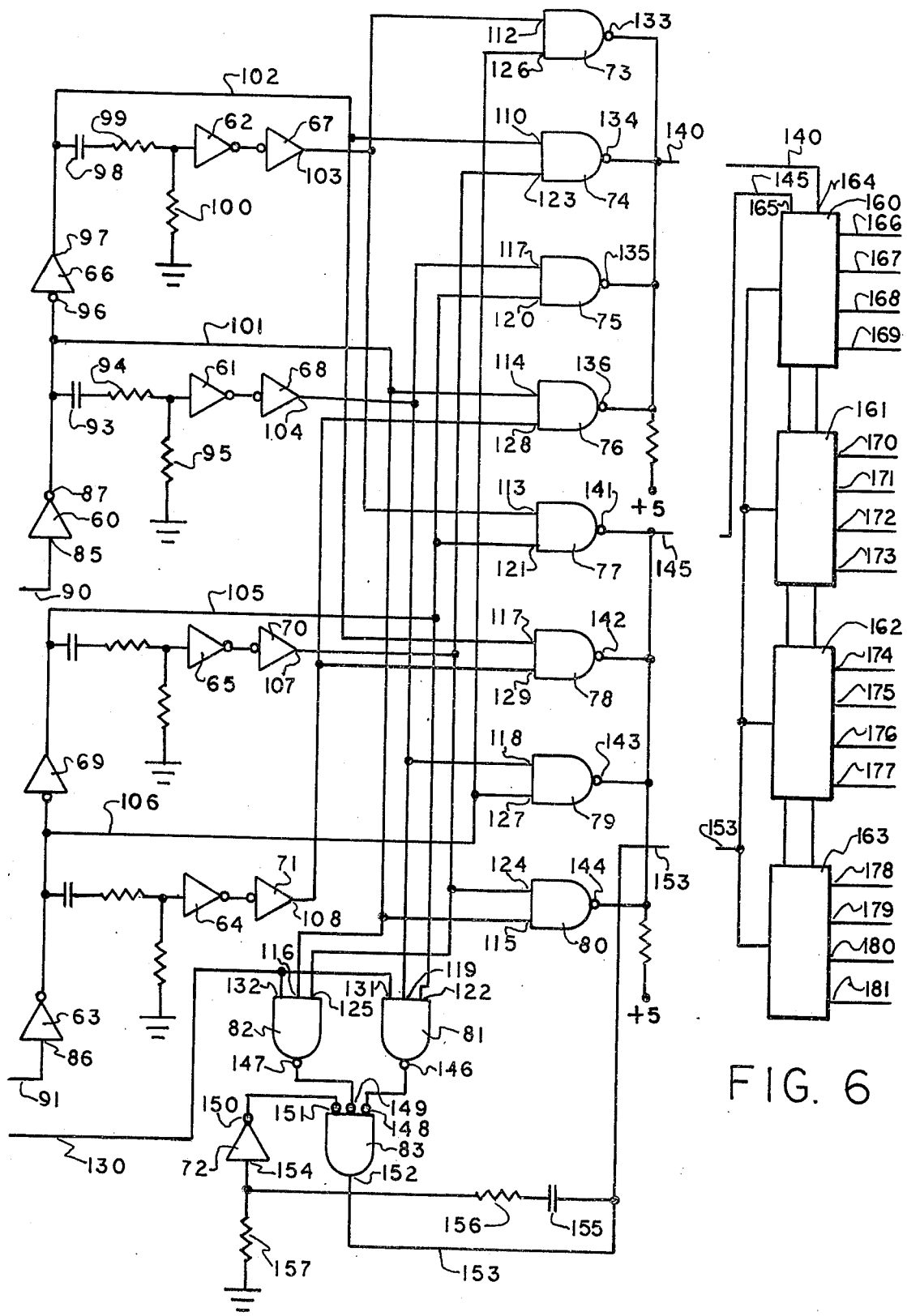
FIG. 5 is a detailed schematic circuit diagram of the encoder interface of FIG. 1.
FIG. 6 is a detailed schematic circuit diagram of the up/down counter of FIG. 1.

Referring now to FIG. 5, there is shown a detailed schematic circuit diagram of the encoder interface 11 of FIG. 1. It comprises Schmitt triggers 60–65, inverters 66–72 and NAND gates 73–83.

Line 90 couples the squared sinusoid A of sensor 47 of FIGS. 3 and 4 to the input 85 of Schmitt trigger 60 and line 91 couples the squared sinusoid B signal from sensor 48 of FIGS. 3 and 4 to the input 86 of Schmitt trigger 63. Schmitt triggers 60 and 63 serve to further square-up the squared sinusoid A and B signals respectively for use by the encoder interface.

The output 87 of Schmitt trigger 60 is coupled to a differentiating circuit comprising capacitor 93 and resistors 94 and 95 which differentiates the negative going edge of the square wave produced at output 87 of Schmitt trigger 60. Output 87 is additionally coupled to input 96 of inverter 66 which has an output 97 coupled to another differentiating circuit comprising capacitor 98 and resistors 99 and 100. The differentiated signals of the positive going edge and negative going edge of the squared-up sinusoid A signal are squared by Schmitt triggers 62 and 61 respectively and then inverted by inverters 67 and 68 respectively.

Output 87 of Schmitt trigger 60 is also coupled to line 101 and output 97 of inverter 66 is coupled to line 102. Thus, line 101 provides the squared sinusoid A signal, output 103 of inverter 67 provides a squarewave corresponding to the differentiated positive going edge of the squared sinusoid A signal and output 104 of inverter 68 provides a squarewave corresponding to the differentiated negative going edge of the squared sinusoid A signal. In like manner, line 105 provides an inverted squarewave of the squared sinusoid B signal, line 106 provides the squared sinusoid B signal, output 107 of inverter 70 provides a squarewave corresponding to the differentiated positive going edge of the squared sinusoid B signal, and output 108 of invertor 71 provides a squarewave corresponding to the differentiated negative going edge of the squared sinusoid B signal.

Line 102 is coupled to input 110 of NAND gate 74, and to input 111 of NAND gate 78. Output 103 of the inverter 67 is coupled to input 112 of NAND gate 73 and to input 113 of NAND gate 77. Line 101 is coupled to input 114 of NAND gate 76 to input 115 of NAND gate 80, and to input 116 of NAND gate 82. Output 104 of inverter 68 is coupled to input 117 of NAND gate 75, to input 118 of NAND gate 79 and to input 119 of NAND gate 81. Line 105 is coupled to input 120 of NAND gate 75, to input 121 of NAND gate 77, and to input 122 of NAND gate 81. Output 107 of inverter 70 is coupled to input 123 of NAND gate 74, to input 124 of NAND gate 80, and to input 125 of NAND gate 82. Line 106 is coupled to input 126 of NAND gate 73 and to input 127 of NAND gate 79. Output 108 of inverter 71 is coupled to input 128 of NAND gate 76 and to input 129 of NAND gate 78. Line 130 which is coupled to the sensor which senses the zero reference position of the reticle and weighing mechanism is coupled to input 131 of NAND gate 81 and to input 132 of NAND gate 82. The function of NAND gates 81 and 82 will be described subsequently.

The interconnection as shown of NAND gates 73-80 provides a means by which four counting pulses are provided by their collective outputs as the reticle traverses between adjacent light transmissive areas. Output 133, 134, 135, and 136 of NAND gates 73, 74, 75 and 76 respectively are coupled together onto line 140 in a wired "OR" configuration and provide line 140 with the up counting pulses indicating increasing weight. As the reticle moves in a downward direction by one-quarter of the distance between adjacent transmissive light areas, a given one of NAND gates 73–76 will provide at its output an up counting pulse. In like manner, outputs 141, 142, 143 amd 144 of NAND gates 77, 78, 79 and 80 respectively provide down counting pulses at line 145.

Output 146 of NAND gate 81 is coupled to input 148 of NAND gate 83 and output 147 of NAND gate 82 is coupled to input 149 of NAND gate 83. Inverter 72 has an output 150 coupled to input 151 of NAND gate 83 and output 152 of NAND gate 83 is coupled to line 153. Input 154 of inverter 72 is coupled to a delay network comprising capacitor 155 and resistors 156 and 157. The delay network is coupled to line 153 by line 158.

NAND gates 81, 82 and 83 are combined to provide a zeroing signal to the up/down counter responsive to the signal provided by the zero reference sensor coupled to line 130. The opaque area corresponding to the zero reference position of the weighing mechanism is dimensioned to be wider than the other light transmissive areas in the first track for providing the sinusoid A and sinusoid B signals. Therefore, the signal on line 130 indicates that the reticle is in the range of reference zero but not necessarily at absolute reference zero. For this reason, inputs 122 and 119 of NAND gate 81 and inputs 125 and 116 of NAND gate 82 are coupled to line 105, output 104 of inverter 68, output 107 of inverter 170, and to line 101 to obtain absolute reference zero. When absolute reference zero is obtained on the reticle, NAND gate 83 will provide at output 152 a zeroing signal to line 153 to reset the up/down counter to zero. The delay network comprising capacitor 155 and resistors 156 and 157 by being coupled to input 151 of NAND gate 83 through inverter 154 assures that the counter is reset to zero. The resetting of the counter to zero when once the reticle has returned to absolute zero assures that the counter will respond in synchronism to the up and down counting pulses provided by NAND gates 73–80.

FIG. 6 shows a detailed circuit diagram of the up/down counter 12 of FIG. 1. The up/down counter comprises four-bit up/down binary coded decimal counters 160, 161, 162 and 163. As shown line 140 which carries the up pulses is coupled to input 164 of counter 160 and line 145 which carries the down pulses is coupled to input 165 of counter 160. The counters are coupled together in a chain such that counter 160 counts units, counter 161 counts tens, counter 162 counts hundreds and counter 163 counts thousands. Each of the counters 160–163 are of the type which recycle after receiving ten pulses. Each of the counters 160–163 has four outputs which provide a four-bit binary word indicative of the decimal value within its respective digit. For example, counter 160 has its outputs coupled to lines 166–169 which provide a four-bit binary word indicative of the decimal value of the units digit. In similar fashion, lines 170–173 provide a four-bit binary word indicative of the decimal value of the tens digit, lines 174–177 contain a four-bit binary word indicative of the decimal value of the hundreds digit and lines 178–181 provide a four-bit binary word indicative of the decimal value of the thousands digit. Each pulse from the encoder interface represents a change of one one-hundredth of a pound on the weighing platform and because the digital weighing and computing system of the present invention has a capacity of twenty-five pounds, the up/down counter must be capable of counting to at least 2500.

Figure 7:
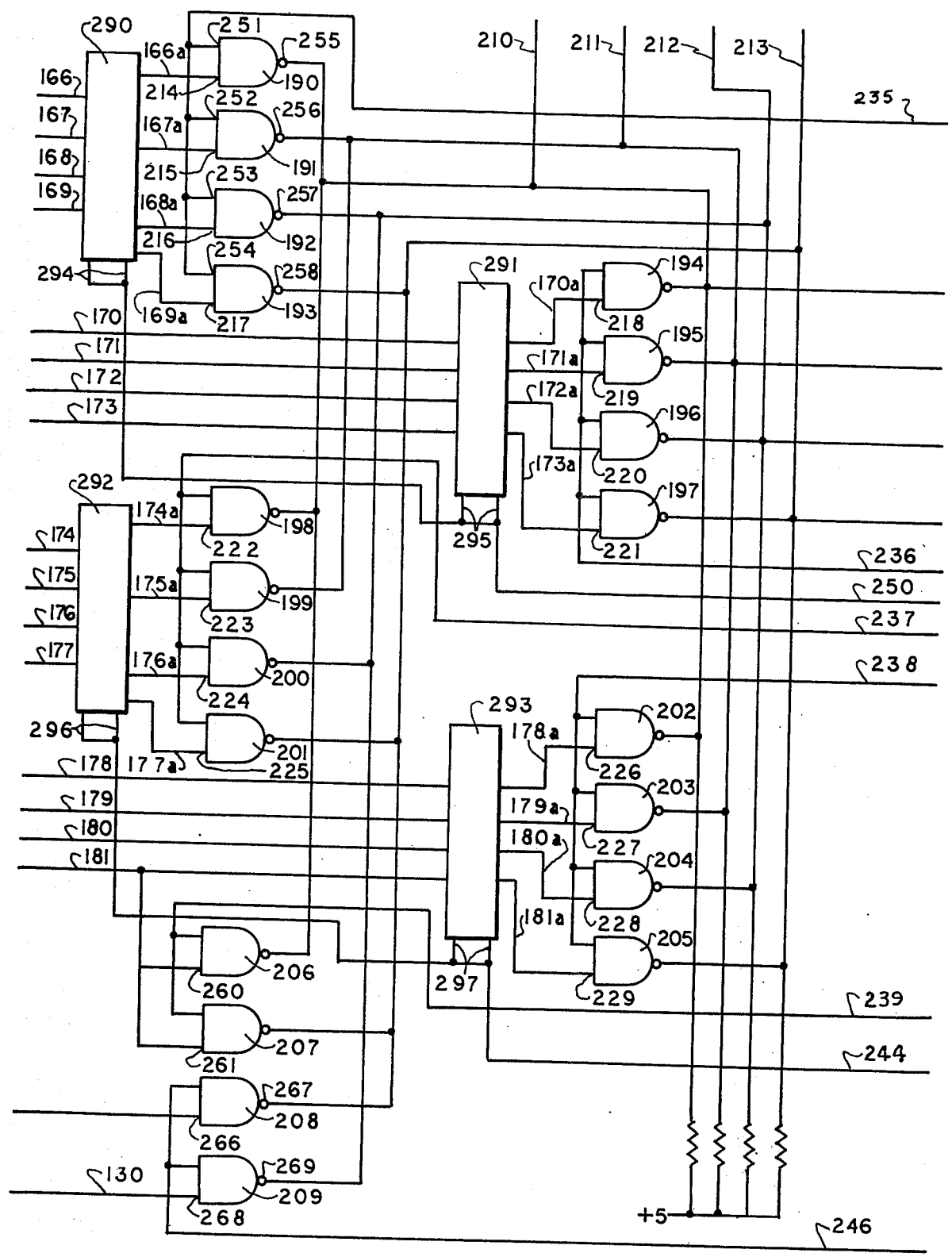
FIG. 7 is a detailed schematic circuit diagram of a portion of the multiplex system of FIG. 1.

Referring now to FIG. 7, FIG. 7 shows a detailed schematic circuit diagram of the portion of the multiplex system 14 of FIG. 1 which transfers the pulse counts from counter 12 to the computer input data lines of the system. The multiplex system of FIG. 7 comprises NAND gates 190–209, computer input data lines 210, 211, 212 and 213 and latches 290–293.

Latch 290 has four inputs each of which is coupled to a respective one of lines 166, 167, 168 and 169 which originate from counter 160.

Nand gates 190, 191, 192 and 193 have inputs 214, 215, 216 and 217 respectively coupled to a respective one of the four outputs of latch 290 via lines 166a, 167a, 168a and 169a. By being so coupled, NAND gates 190–193 receive from latch 290 the four-bit binary word indicative of the decimal value of the least significant digit of the pulses counted by the up/down counter. In like manner, NAND gates 194, 195, 196 and 197 have inputs 218, 219, 220 and 221 respectively coupled to lines 170a, 171a, 172a and 173a respectively for receiving a four-bit binary word indicative of the decimal value of the tens digit of the pulses counted from latch 291. NAND gates 198, 199, 200 and 201 have inputs 222, 223, 224 and 225 respectively coupled to lines 174a, 175a, 176a and 177a respectively for receiving a four-bit binary word indicative of the decimal value of the hundreds digit of the pulses counted from latch 292. Lastly, NAND gates 202, 203, 204 and 205 have inputs 226, 227, 228 and 229 respectively coupled to lines 178a, 179a, 180a and 181a respectively for receiving a four-bit binary word indicative of the decimal value of the thousands digit of the pulses counted from latch 293.

Figure 8:
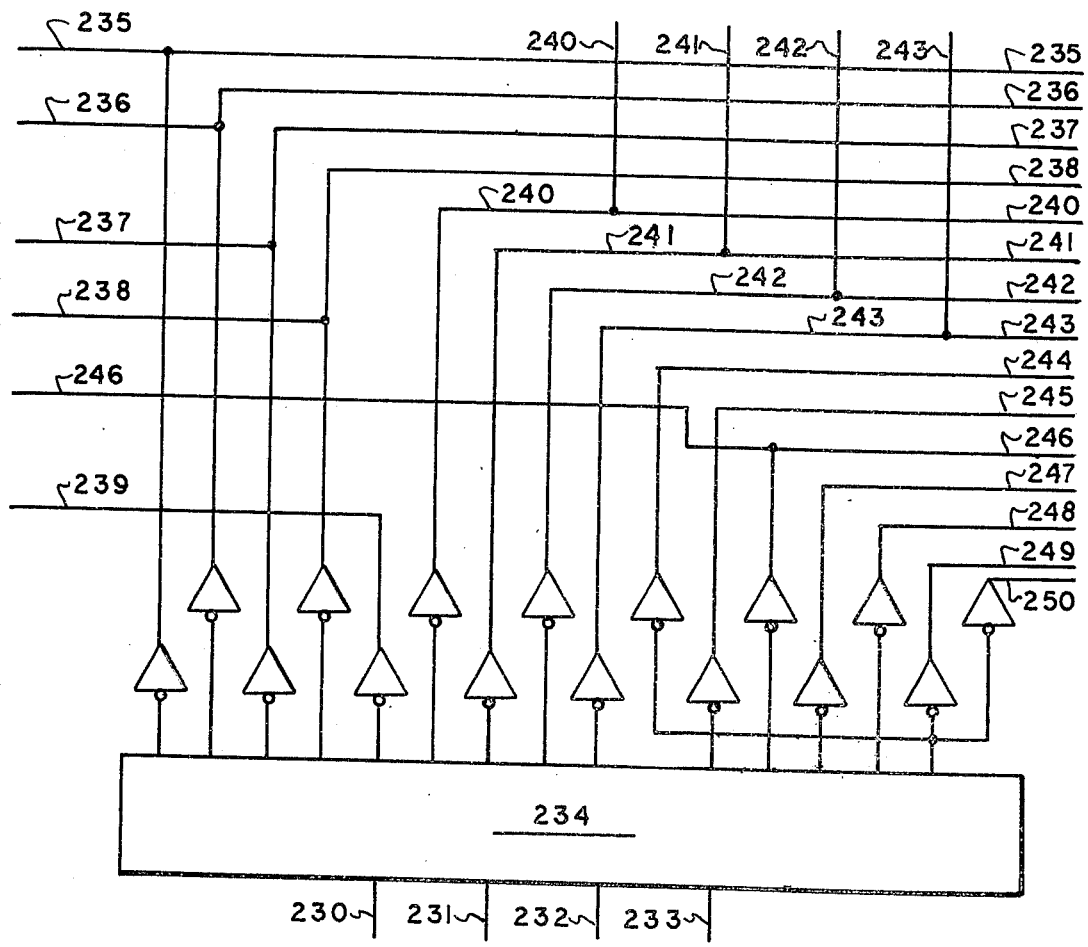
FIG. 8 is a detailed schematic circuit diagram of the remaining portion of the multiplex system of FIG. 1.

As previously explained, the computer accesses data within the system via its controller by establishing four-bit binary word addresses. Making reference to FIG. 8 for a moment, FIG. 8 shows the multiplex system address decoder of the multiplexing system. The computer, when accessing data from either the up/down counter or the keyboard, or providing data to the display memory, establishes the four-bit binary word addresses on lines 230, 212, 232 and 233. Inasmuch as the addresses are expressed in a four-bit binary word, a total of sixteen different addresses may be provided. Decoder 234 receives the four-bit binary word addresses one at a time, decodes them and then accesses the desired location by setting up one of the sixteen output lines 235–250. The system multiplexes in a sequence by setting up lines 235–250 in sequence starting with line 235. At the end of each multiplex cycle the system sets up lines 244 and 250. Line 244 is coupled to latches 292 and 293, and line 250 is coupled to latches 290 and 291. When lines 244 and 250 are set up, the four-bit binary word of each of counters 160, 161, 162 and 163 is transferred to and stored in latches 290, 291, 292 and 293 respectively. The count information from the up/down counter is stored so that the count data will not change during a read in cycle.

For accessing the count information, the computer establishes four different four-bit binary word addresses to cause decoder 234 to set up lines 235, 236, 237 and 238 in sequence. Line 235 is coupled to inputs 251, 252, 253 and 254 of NAND gates 190, 191, 192 and 193 respectively. When the decimal value of the least significant digit of the counts counted by the up/down counter is accessed, the computer establishes on lines 230–233 a four-bit binary word address corresponding to the setting up of line 235 by the decoder 234. When line 235 is set up, it causes the four-bit binary word indicative of the decimal value of the least significant digit of the counts counted by the up/down counter to be transferred from NAND gates 190–193 onto the input data lines 210–213 of the computer. NAND gates 190, 191, 192 and 193 have outputs 255, 256, 257 and 258 respectively coupled to data input lines 210, 211, 212 and 213 respectively to provide the data transfer.

In like manner, the four-bit binary words indicative of the decimal values of the tens, hundreds and thousands digit are transferred to the input data lines 210–213 by the setting up of lines 236, 237 and 238 respectively. In accessing the total number of counts in the up/down counter, the computer sequentially establishes the location addresses corresponding to lines 235, 236, 237 and 238. Even though the count information transferred lags real time by one multiplex cycle because it is stored in latches 290-293, the operation of the system is not effected because the system goes through the multiplex cycle three hundred times a second.

NAND gates 206 and 207 of the multiplex system of FIG. 7 are utilized to transfer negative reticle displacement information to the computer. Inputs 260 and 261 of NAND gates 206 and 207 are coupled to line 181 which originates from the most significant bit of counter 163 of the up/down counter. When the weighing mechanism reticle is deflected through zero, the most significant bit of counter 163 willattain a logic level indicative of that fact and is transferred to inputs 270 and 261. Negative values of the counter are expressed by the number of counts below zero plus 10,000 such that, for example, two counts below zero is counted as 9998. Therefore, as the reticle is displaced through zero, NAND gates 206 and 207 when accessed by the computer by line 239 establishes a logical 1 on line 210 and a logical 1 on line 213 such that the four-bit binary word sent back to the computer on the input data lines is a 1001 which in decimal form is a 9. This notifies the computer that the scale is in the negative region.

NAND gates 208 and 209 are utilized to transfer the end of limits information to the computer. As previously explained, a third track may be added to the reticle containing a light opaque area at a lower negative weight limit and a light opaque area at an upper range limit. For this preferred embodiment, the lower limit is chosen to be minus one-half pound and the upper limit plus 25.00 pounds. When the sensor associated with the third track provides an output indicating that the scale is either at its lower limit or upper limit, a signal will be established on line 265 which is coupled to input 266 of NAND gate 208. NAND gate 208 is accessed by the computer via line 246 and when line 246 is established by its corresponding four-bit binary word address on lines 230-233 will cause the out of limits information to be passed to the computer via line 213 which is coupled to output 267 of NAND gate 208.

NAND gate 209 has an input 268 coupled to line 130 of the encoder interface of FIG. 5. Recalling for the moment that line 130 is coupled to the sensor associated with the second track which contains the zero reference light opaque area on the reticle, NAND gate 209 serves as a zero reference detector and provides direct access by the computer to the zero reference sensor. When power is first applied in the system, line 130 is accessed by computer line 246 and NAND gate 209 will provide an output 269 to transfer the zero reference indication to line 212. If the scale is at absolute zero the displays will be illuminated and the system will be ready for operation.

Figure 9:
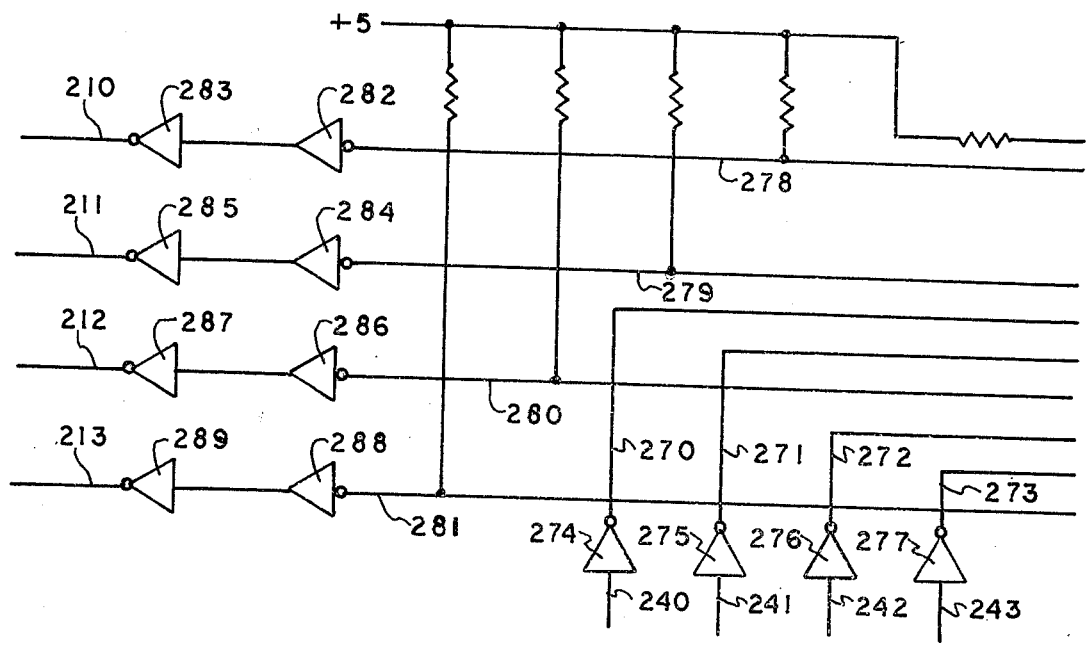
FIG. 9 is a schematic circuit diagram of the keyboard of FIG. 1 with the rest of the system.

Referring now to FIG. 9, FIG. 9 shows the schematic circuit diagram of the keyboard interface which interfaces the keyboard with the multiplex system and input data lines to the computer. As previously explained, the sixteen key keyboard is configured in a four by four matrix. Beneath the keys are four horizontal conductors and four vertical conductors with the sixteen keys being located above the intersection of the conductors. The conductors are spaced apart such that when a key is depressed one horizontal line and one vertical line are shortened together. The keyboard interface of FIG. 9 comprises conductors 270, 271, 272 and 273 which are coupled to lines 240, 241, 242 and 243 respectively of the multiplex system address circuit of FIG. 8 by inverters 274, 275, 276 and 277 respectively. Conductors 270, 271, 272 and 273 correspond to the horizontal conductors lying beneath the keyboard keys. The keyboard interface additionally comprises conductors 278, 279, 280 and 281 which correspond to the vertical conductors lying beneath the keyboard keys. Conductor 278 is coupled to line 210 of the input data lines to the computer by inverters 282 and 283. Conductor 279 is coupled to data input line 211 by inverters 284 and 285. Conductor 280 is coupled to data input line 212 by inverters 286 and 287 and conductor 281 is coupled to data input line 213 by inverters 288 and 289.

In transferring keyboard data to the computer input data lines, the horizontal conductors 270-273 are set up by decoder lines 240-243 respectively in a sequential manner one at a time. In operation, assume for the moment that the computer wishes to determine if one of the keys of the keyboard overlying conductor 270 is depressed. The computer will establish on multiplex address line 230-233 a four-bit binary word causing line 240 to be a logical zero. The logical zero on line 240 is inverted by inverter 274 and places a logical 1 level on conductor 270. If for example, the key above the intersection of lines 270 and 278 is depressed, the logical 1 on conductor 270 will be transferred to conductor 278 which is inverted by inverter 282 to a logical zero and again inverted by inverter 283 to provide data input line 210 with a logical 1 indicating that the key immediately above the junction of conductors 270 and 278 was depressed. A similar procedure ensues for each of the other fifteen keys.

There is no possibility that the depression of one of the keys will be missed inasmuch as the computer is controlled by a high frequency clock which causes the computer to access the keyboard frequently enough that each keyboard conductor is accessed two or three times during the time interval in which it takes to depress a key. As can be seen from FIG. 9, a total of sixteen different combinations of conductor junctions are possible and the computer is able to keep track of which key is depressed by known which horizontal line has been accessed and which vertical line has been brought in contact with the known horizontal line.

Referring back to FIG. 8, decoder 234 establishes responsive to the four-bit binary word addresses on line 230-233 lines 235, 236, 237, 238, 240, 241, 242, 243, 245, 246 and 247 for the transferring of data to be displayed to the display memory 22 of FIG. 1. lines 250, 249 and 248 are utilized for lighting lamps on the display.

Figure 10:
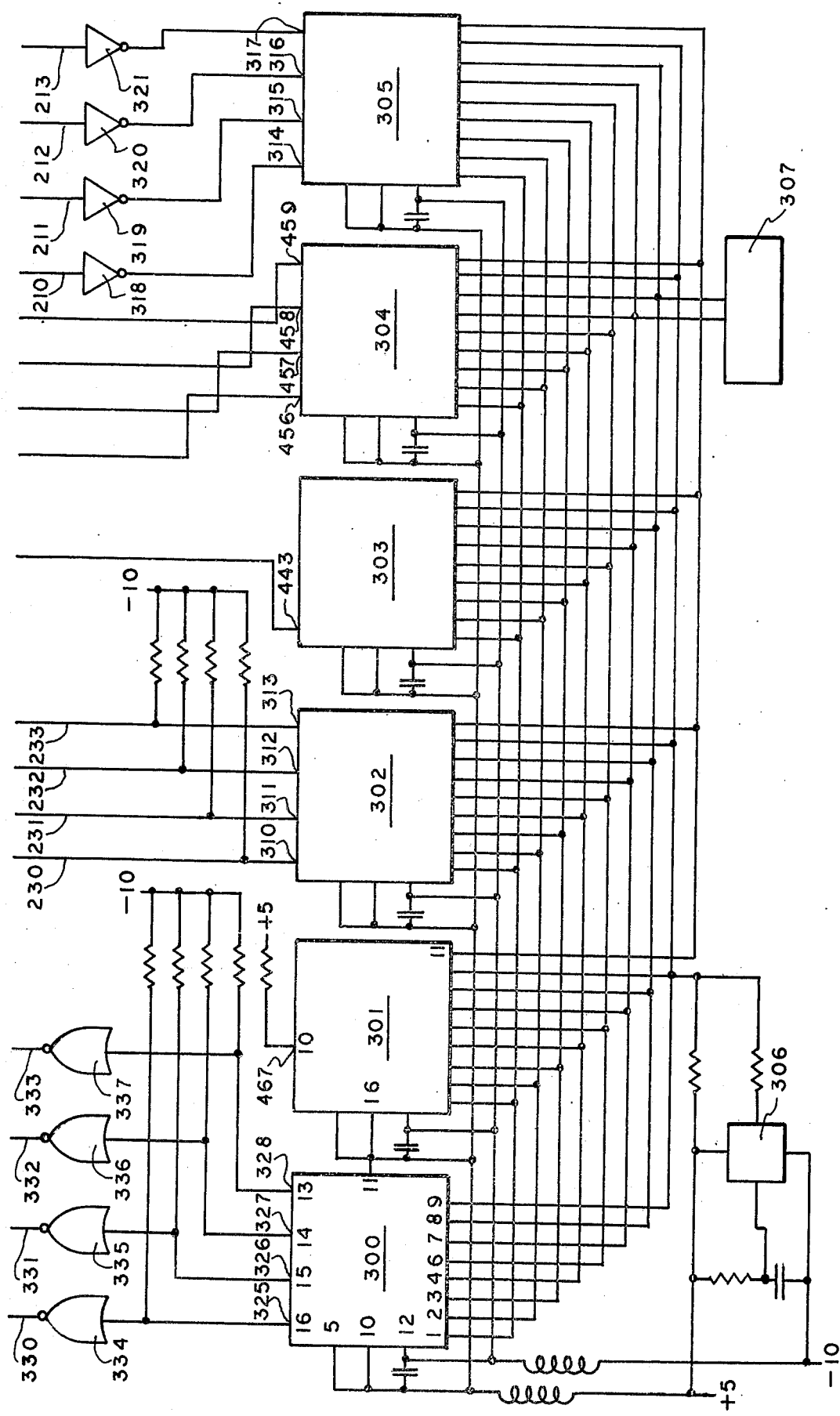
FIG. 10 is a circuit diagram of the computer of the weighing and computing system of FIG. 1.

Referring now to FIG. 10, FIG. 10 shows a circuit diagram of a computer which may be utilized in practicing the present invention. The computer comprises six integrated circuits, circuits 300, 301, 302, 303, 304 and 305. For convenience, numbers within each of the individual circuit boxes correspond to pins on the individual circuits and are shown in this manner to afford convenience in practicing the present invention.

Circuits 302, 303, 304 and 305 comprise read only memory stores which contain the hard wired program under which the computer functions. Circuit 301 is a central processor unit circuit and in conjunction with read only memories 302-305 provides the controller 22, subtracter 19 and multiplier 20 of FIG. 1. Circuit 300 comprises a random access memory and includes memories for storing variable data. It corresponds to the reference weight memory 16, gross weight memory 17, unit price memory 18 and net price accumulator 21 of FIG. 1.

The six integrated circuits are available commercially from Intel Corporation of Santa Clara, California and may be obtained as a six integrated circuit set. The random access memory 300 and central processor unit 301 are standard items and the read only memory store integrated circuits 302, 303, 304 and 305 must be custom made to facilitate the proper functioning of the six integrated circuit computer. One form in which the read only memory store integrated circuits 302–305 may take is represented in the following computer print out which Intel Corporation requires for determining the lead pattern of the read only memory store integrated circuits 302–305 to provide the computer with a fixed program suitable for practicing the present invention. The computer print out reads as follows:

```
I4001-0836-(00)HHHH
   0 BPNPNPPNPF     1 BNNPPPNNPF     2 BPNPNPPNPF     3 BPNNNPNPPF
   4 BPNPNPPNNF     5 BPNNNPPPPF     6 BNPNPPPPPF     7 BNNNNPNPNF
   8 BPPPNNPNPF     9 BPPPPPPPPF    10 BPNPNPPNNF    11 BPPNPPNNNF
  12 BPPPNNNPPF    13 BPPPPPPPPF    14 BPNPNPPNPF    15 BPNNNPNPPF
  16 BPPNPPPNPF    17 BPPPNPNPNF    18 BPPNPPNNPF    19 BPPPPNNPPF
  20 BPPNPNPPPF    21 BPPPPNNPPF    22 BPPNPPPNNF    23 BNNNPNPPNF
  24 BNNNNPNNPF    25 BPPPNPPNPF    26 BPNPPPPPNF    27 BPNNPPNNPF
  28 BPNNNPPNF     29 BPPPNNPPPF    30 BPNNPPPNNF    31 BPNNNPNNNF
  32 BPPPNPNPPF    33 BNNPNNNNNF    34 BNNNPPNPPF    35 BNNNPNNPNF
  36 BNNNNPPNPF    37 BNNNPPNPNF    38 BPPPNNNPPF    39 BPPNPPNPPF
  40 BNNNPNNNNF    41 BPPPNPNPPF    42 BPPNPNNPNF    43 BNNNNPPNPF
  44 BNNNPPNNNF    45 BNNNPNNNPF    46 BPPPNPNPPF    47 BPPNNPNPPF
  48 BNNNNPPNPF    49 BNNNPPNNPF    50 BPPPNPNPPF    51 BPNNPPPPNF
  52 BPPNPPPNPF    53 BPPNNPNNPF    54 BPNPNPPNNF    55 BPPPNPNPPF
  56 BPNPNNNPF     57 BNNNNNPPPF    58 BPPPNPNPPF    59 BPPNNNNPNF
  60 BPNNPNNNNF    61 BPNPNPPNPF    62 BNNPNNNNNF    63 BPNPPPPPNF
  64 BPPPNPPNNF    65 BNNPNPNPPF    66 BNNNPPNNNF    67 BNNNPNNPPF
  68 BNPNNPNNPF    69 BNNNPPNPPF    70 BNNNNPNPPF    71 BPPPNPNPPF
  72 BPNNPPNNNF    73 BNPPPPNNPF    74 BPPPNNNPPF    75 BPNPNPPNPF
  76 BNNNPNNNPF    77 BPPPNPNPPF    78 BPPNNPNPPF    79 BNNPNNPPPF
  80 BPNPPPPPPF    81 BPPNNPPPNF    82 BNNNPNNPPF    83 BNNNNPPPNF
  84 BNNNNPNNF     85 BPPPNNPNPF    86 BPNNNNNPNF    87 BPPPNPNPPF
  88 BNPNNNNPNF    89 BNNNNNPPPF    90 BPPPNPNPPF    91 BNPNPPNNNF
  92 BNNNNNPPPF    93 BPNPPNNPF     94 BPPPPNNPNF    95 BPPNPPNNNF
  96 BNNNPPPPPF    97 BPPNPNNNPF    98 BNNNPNPPPF    99 BPNPNPPNPF
 100 BNNPNNNNNF   101 BPNPPPPPNF   102 BNNNNNNPPF   103 BPNPNPPNNF
 104 BPNNNNPPPF   105 BPNPNPPNPF   106 BPNNNPNPPF   107 BPNPNPPNNF
 108 BNPNNPPNNF   109 BPNPNPPNPF   110 BPNNNPNPPF   111 BPPNPPPNPF
 112 BPPPNNPPPF   113 BPPNPPPNNF   114 BNNNPNPPNF   115 BPPPNNNPPF
 116 BPNNPNNPNF   117 BPPNPPPNPF   118 BPPNNPPPPF   119 BPNPNPPNPF
 120 BNNPNNPNF    121 BNNNPPNPPF   122 BNNNPPNPNF   123 BPNPPPPPF
 124 BNPNNPNNNF   125 BNPNNNPNPF   126 BNNNPNNNPF   127 BNPNNNPPF
 128 BNNPNNPPPF   129 BNNNPPNNNF   130 BPPNPPPNPF   131 BPPPPPPPPF
 132 BPPNPPPNNF   133 BNNNPNNPNF   134 BPPPNNNPPF   135 BPPPPNNNPF
 136 BNPNPNPPPF   137 BPPPNNNPPF   138 BNPPPNNPNF   139 BPNPNPPNNF
 140 BPNPPNPNNF   141 BPPNPNNNPF   142 BNNNPPPPPF   143 BPNPNPPNPF
 144 BNNPNNNNNF   145 BPPPNPNPF    146 BNPNPPPNPF   147 BPPNPPPNPF
 148 BPPPPNPNPF   149 BNPNNNNNNF   150 BPPNPPPNNF   151 BNNNPNPPNF
 152 BNPNNNPNPF   153 BNNNPPPPPF   154 BPNNPPPNNF   155 BPNNNNNNF
 156 BNPPNPNNPF   157 BNPNPPPNPF   158 BPPPNPNPPF   159 BPPPPNNNPF
 160 BPNPPPPPNF   161 BPNNNNPNPF   162 BPPNPPPNPF   163 BPPNNPNNPF
 164 BNNPNNNPPF   165 BPNPPPPPPF   166 BNPPNPNPNF   167 BPNPNPPNPF
 168 BNNNNNNPPF   169 BPPPNNNPPF   170 BNPNNPPNNF   171 BPNPNPPNNF
 172 BPNPNNNNNF   173 BPPNPNNNPF   174 BNNNPNPPNF   175 BPNPNPPNPF
 176 BNNPNNNNNF   177 BPNPPPPPNF   178 BPNNNNPNPF   179 BPNPNPPNPF
 180 BNNPNNNPNF   181 BPPPNPPNPF   182 BNPNPNPNNF   183 BPPNPPNPPF
 184 BPPNNPNNPF   185 BPNPNPNPF    186 BNPPNNNNPF   187 BPNPPPPPNF
 188 BPNNNPNPF    189 BPNPNPPNPF   190 BNNNNNNPPF   191 BPPPNPNPPF
 192 BNNNPNPPF    193 BPNPNPNPF    194 BNNPNNNPNF   195 BPPPNPPNPF
 196 BNNNPPPPPF   197 BPNPNPPNNF   198 BPPNPPNPPF   199 BPPPNNNPPF
 200 BNNPPNNPNF   201 BPNPNPPNNF   202 BNPPNPNPPF   203 BPNPPPPPF
```

I4001-0836-(00)HHHH

| | | | | | | | |
|---|---|---|---|---|---|---|---|
| 204 | BPPNPPPNNF | 205 | BPPNPPPNPF | 206 | BPPPPPNPNF | 207 | BPPNPPPNNF |
| 208 | BNNNPNPPNF | 209 | BNNNPNPPF | 210 | BPPPNPNPPF | 211 | BNNNNPPNF |
| 212 | BPNPNPPNPF | 213 | BNPNPNNPPF | 214 | BPNPNPPNPF | 215 | BNPNNPPPPF |
| 216 | BPNPNPPNNF | 217 | BNPPNPNPPF | 218 | BPNPNPPNPF | 219 | BNPNPPPPPF |
| 220 | BPNPNPPNNF | 221 | BNPNPNPNNF | 222 | BPNPPPPPNF | 223 | BPPPPPPPNF |
| 224 | BPPNPPNPPF | 225 | BPPNPNNPF | 226 | BPNPNPPNPF | 227 | BNPPNNNNPF |
| 228 | BPNPNPPNPF | 229 | BNNPNPNNNF | 230 | BPPNPPPNPF | 231 | BPPPPNPNPF |
| 232 | BPPNPPNPPF | 233 | BPPNPPPPPF | 234 | BNNPNNNPNF | 235 | BPNPNPPNPF |
| 236 | BNPNPPPPNF | 237 | BPNPNPPNPF | 238 | BNPNNPPPPF | 239 | BPNPNPPNNF |
| 240 | BPPNPPNPF | 241 | BPPPNNNPPF | 242 | BNNNNNPNNF | 243 | BPNPNPPNNF |
| 244 | BPNNNNPPPF | 245 | BPNPNPPNPF | 246 | BPNNNPNPPF | 247 | BPNPNPPNNF |
| 248 | BNPNNPNNPF | 249 | BPNPPPPPNF | 250 | BPPPNPPNNF | 251 | BPNPNPPNNF |
| 252 | BNPNNNPNF | 253 | BPPNPPNPPF | 254 | BNNNNPNNPF | 255 | BPNPNPPNPF |

I4001-0837-(01)PPPP

| | | | | | | | |
|---|---|---|---|---|---|---|---|
| 0 | BNNPPNPPPF | 1 | BPPNPPPNPF | 2 | BPPPPNPNF | 3 | BPPNPNNNPF |
| 4 | BNNPPNPPNF | 5 | BPNPNPPNPF | 6 | BNNPPPPNF | 7 | BPPNPPPNPF |
| 8 | BPPNNPPPPF | 9 | BPPNPPPNNF | 10 | BNNNPNNPPF | 11 | BNNNNPPNPF |
| 12 | BNNNNNPNNF | 13 | BNNNPPNPPF | 14 | BPPPNNPNPF | 15 | BPPPNPPNNF |
| 16 | BNNNPNNPNF | 17 | BNNNNPPNPF | 18 | BNNNPPNNF | 19 | BPPNPPPNPF |
| 20 | BPPPPNPNPF | 21 | BPPNPPNPPF | 22 | BPPNPNPPPF | 23 | BNNPNNNPNF |
| 24 | BPNPNPPNPF | 25 | BNPNPPPNPF | 26 | BPNPNPPNNF | 27 | BPNNNPPPPF |
| 28 | BPPPNNPNPF | 29 | BPNPPNPNNF | 30 | BPPNPPPNPF | 31 | BPPPNPPPPF |
| 32 | BPNPNPPNPF | 33 | BNPNPNNPPF | 34 | BPNPNPPNNF | 35 | BPPPPNPPPF |
| 36 | BPNPNPPPNF | 37 | BNNNPPPPPF | 38 | BNPNPPPPPF | 39 | BPPNPPPNPF |
| 40 | BPPNPPPPNF | 41 | BPPPNPNPF | 42 | BPPNPNNNF | 43 | BPNPNPPPNF |
| 44 | BNNNPPPPPF | 45 | BPNPNPPNPF | 46 | BPPNPPPNPF | 47 | BPPNPPPNNF |
| 48 | BNNNNPPPNF | 49 | BNNNPNPPNF | 50 | BNNNNPNPNF | 51 | BPPPNPPNPF |
| 52 | BPNPPNPNNF | 53 | BPPPNNNPPF | 54 | BPNPPPPPPF | 55 | BNPNPPPNNF |
| 56 | BNNNNPPPF | 57 | BPPPNNPPF | 58 | BPNPPNPNNF | 59 | BNPNNPPNNF |
| 60 | BPPNPPPNNF | 61 | BNNNPNPNF | 62 | BPNPPPPPNF | 63 | BPPNNPNPNF |
| 64 | BPNPNPPNPF | 65 | BNNPPNNPF | 66 | BPPNPPPNPF | 67 | BPPPPPPNNF |
| 68 | BPPNPPPNNF | 69 | BNNPNNNNPF | 70 | BNNNPPPPPF | 71 | BPNPNPPNPF |
| 72 | BPNNNPNPPF | 73 | BPNPPPPPNF | 74 | BPPPNNPNPF | 75 | BPPNPPPNPF |
| 76 | BPPPPPPNNF | 77 | BPPNPPPNNF | 78 | BNNPNNNNPF | 79 | BNNNNPPPNF |
| 80 | BNNNPNPPF | 81 | BPPNPNNPPF | 82 | BPNPNNPNPF | 83 | BPPNPPPNPF |
| 84 | BPNPNPPPF | 85 | BPPNPPNPPF | 86 | BPPPPNPNPF | 87 | BNNPNNNPNF |
| 88 | BPNPPNPNF | 89 | BNPNPPPNPF | 90 | BPPNPPNPF | 91 | BPPPNPPPPF |
| 92 | BPPNPPPNNF | 93 | BNNNPNNNF | 94 | BPPPNNNPPF | 95 | BNNPNNNNPF |
| 96 | BPPNPPPNPF | 97 | BPPPNPNPPF | 98 | BPPNPPNPPF | 99 | BPPNPNNNNF |
| 100 | BPNPNPPNNF | 101 | BPPNPNPNNF | 102 | BPPPNPNPPF | 103 | BPNNPNNNPF |
| 104 | BPNPPPNPF | 105 | BPPPNPPPPF | 106 | BPNPNPNPF | 107 | BNPPPNNPF |
| 108 | BPPPNNPNPF | 109 | BPNNNPPPPF | 110 | BPNPPPNPF | 111 | BNPNNNPPF |
| 112 | BNNNPNNPPF | 113 | BNNNPPNPPF | 114 | BNNNNPPPPF | 115 | BPPPNNNPF |
| 116 | BNNPNNNNPF | 117 | BNNNPNNPNF | 118 | BNNNNPPNNF | 119 | BNNNPPNPNF |
| 120 | BPPPNNNPPF | 121 | BNNPNNNNPF | 122 | BPPNPPPNPF | 123 | BPPNPNPNNF |
| 124 | BPPNPPNPPF | 125 | BPPNPNNPF | 126 | BPPNPPNNPF | 127 | BPPNPNPNNF |
| 128 | BPNPNPPNPF | 129 | BNPPNPNPF | 130 | BPNPPPPPF | 131 | BNNNNNPPF |
| 132 | BPPNPPPNPF | 133 | BPPNPNPNNF | 134 | BPNPNPPNNF | 135 | BPPPPNNNPF |
| 136 | BPPNPNPPF | 137 | BNNPNNNNF | 138 | BPPNPPPNF | 139 | BPPPNNPNF |
| 140 | BPNPNPPNPF | 141 | BNNNNPPNF | 142 | BPNNPPPNNF | 143 | BPNPNPPNPF |
| 144 | BNNNNPPPF | 145 | BPPNPPPNPF | 146 | BPPNPNNNF | 147 | BPNPNPPNNF |
| 148 | BPPNPPPPF | 149 | BPPPNPPNPF | 150 | BNPNNPNNF | 151 | BPPNPPPNPF |
| 152 | BPPNPNPNNF | 153 | BPNPPPPPNF | 154 | BNPNPPNPF | 155 | BPPNPNNNPF |
| 156 | BNNPNNPPF | 157 | BPNPPPNPF | 158 | BNNPNNNNF | 159 | BPPNPPPNPF |
| 160 | BPPNNNPNNF | 161 | BPNPPPNPF | 162 | BNPPPPNNF | 163 | BPPNPPPNPF |
| 164 | BPPNPPPPF | 165 | BPPNPPNPF | 166 | BPPPPPPPF | 167 | BPNPNPPNNF |
| 168 | BPPNNNPNNF | 169 | BPPNPPPPPF | 170 | BNNNNPNNF | 171 | BPNPNPPNPF |
| 172 | BNNPNPPNNF | 173 | BPNPNPPNF | 174 | BNNNNNPPF | 175 | BPPPNPNPF |
| 176 | BNPNNPNPF | 177 | BPNPNPPNF | 178 | BNNPNNNPNF | 179 | BPPPNPNPF |

I4001-0837-(01)PPPP

| | | | |
|---|---|---|---|
| 180 BNNPPPPPF | 181 BPPNPPPNPF | 182 BPPPPNPNPF | 183 BPPNPPPNNF |
| 184 BNNNPNNPNF | 185 BPPPNPNPPF | 186 BNNPPPPPPF | 187 BPNPNPPNPF |
| 188 BNNPNPPPNF | 189 BPPNPPPNNF | 190 BNNNPPPPPF | 191 BNNNPPNPNF |
| 192 BPNPNPPNNF | 193 BPPNPPNNNF | 194 BPPPNPPNPF | 195 BNNPPNPNNF |
| 196 BPNPNPPNPF | 197 BNNPNNNPNF | 198 BPPPNPPNPF | 199 BNNPNPNNNF |
| 200 BNNNPPNNPF | 201 BPNPPPPPNF | 202 BNNPNPNPNF | 203 BPPNPPPNPF |
| 204 BPPPPPPPPF | 205 BPPNPPPNNF | 206 BNNNPNNNPF | 207 BPPPNPNPNF |
| 208 BNNPNPNPNF | 209 BNNPNPPPPF | 210 BNNNPPNNPF | 211 BPNPNPPNNF |
| 212 BPNPNNNNNF | 213 BPPNPPPNPF | 214 BPPNPPPPPF | 215 BPPNPPPNNF |
| 216 BNNPNNNNPF | 217 BNNNPPNNPF | 218 BPNPNPPNPF | 219 BNPPNNNPPF |
| 220 BNNNPPNPPF | 221 BNNNPPNPNF | 222 BPNPPPPPPF | 223 BPPPNNNNPF |
| 224 BPPNPPPNPF | 225 BPPNPPPPPF | 226 BNNPNNPPPF | 227 BNPNNNNNNF |
| 228 BNNNNPPPNF | 229 BPNPNPPNNF | 230 BPNNPNPPPF | 231 BNNNPNPPNF |
| 232 BNNNPNPNNF | 233 BNNNNNPNNF | 234 BNNNPPPPPF | 235 BPNNPPPNNF |
| 236 BPNNNNNNNF | 237 BNNNPPNPNF | 238 BNNPPPPPPF | 239 BPPNPPPNPF |
| 240 BPPPNPPPPF | 241 BPPNPPPNNF | 242 BNNNPNNNPF | 243 BPPPNNNPPF |
| 244 BNNPNPNPNF | 245 BPNNPPPNPF | 246 BPPNPPPNNF | 247 BNNNPNNNPF |
| 248 BNNNNPPNPF | 249 BNNNPPNNNF | 250 BPPPNNNPPF | 251 BNNPNNPNPF |
| 252 BPNPNPPNNF | 253 BPPNPPPNPF | 254 BPPPNPNPPF | 255 BPNNNPPNPF |

I4001-0838-(02)HHHH

| | | | |
|---|---|---|---|
| 0 BPNPNPPNPF | 1 BNNPNNNPNF | 2 BPPPNPPNPF | 3 BPNNNPPNPF |
| 4 BPPNPPNPF | 5 BPPNPPPPPF | 6 BPPNPPNPPF | 7 BPPPPPPPPF |
| 8 BPNPNPPNPF | 9 BNNPNPNPNF | 10 BPNPNPPNPF | 11 BNNNNNNPPF |
| 12 BPPPNPNPPF | 13 BPNNNPPPPF | 14 BPPPPNPPPF | 15 BPPPPNPNPF |
| 16 BPPNPPNPPF | 17 BPPPNPNPNF | 18 BPNPPPNPPF | 19 BNPNPPPPPF |
| 20 BPPNPPPNPF | 21 BPPPNPNNNF | 22 BPPNPPNPPF | 23 BPPPPPNPF |
| 24 BPPNPNNPPF | 25 BNNPNPPPPF | 26 BNNNNPPNF | 27 BPPNPPPNNF |
| 28 BNNNPNPNF | 29 BNNNNPNNF | 30 BNPNNNNNF | 31 BNNNNPNNNF |
| 32 BNPNNPNPPF | 33 BNNNNPNNF | 34 BPPPNNPNPF | 35 BPPNPPNPNF |
| 36 BNPPPPNPNF | 37 BNPPPNNNNF | 38 BNNNPPPPPF | 39 BPPPNPNPPF |
| 40 BPPNPNPNPF | 41 BPNNPNPNF | 42 BNPNNPPNNF | 43 BNNNNNPPPF |
| 44 BNPNNPNNF | 45 BPNNNNPPF | 46 BPPPNNPNPF | 47 BNPPPNPNF |
| 48 BPPPNPNPF | 49 BPPNNNPNNF | 50 BPPNPPPNPF | 51 BPPNPPPPPF |
| 52 BPPNPPNPF | 53 BPPNPNPPF | 54 BPPNPPNNF | 55 BPPNPNPPF |
| 56 BNNPNNPPPF | 57 BPNPNPPNPF | 58 BNPNNPNNNF | 59 BNPNPNNPF |
| 60 BPPPNPNPF | 61 BPNPPPNPF | 62 BPNPNPPNF | 63 BNNNPPPPPF |
| 64 BPNPPPNPF | 65 BPPPNPNPPF | 66 BPPNPPNPF | 67 BPPPPNNPF |
| 68 BPPNPPNNF | 69 BNNNPNPPNF | 70 BNNNNPNPF | 71 BNNNNPPNF |
| 72 BNNNNPNNF | 73 BPPPNPNPF | 74 BPNPNPPNF | 75 BNPNNNPPF |
| 76 BPPNPPNPF | 77 BPPNPPPPF | 78 BPNPPPNPF | 79 BNNNPPPNF |
| 80 BNPNPPPPNF | 81 BNNNNPNNF | 82 BPNPPPPPF | 83 BPNPPNPNF |
| 84 BPPNPPNPF | 85 BPPNPPNPF | 86 BNPNPPPPF | 87 BNNNNPNNF |
| 88 BNNNNPNNF | 89 BPPPNNPNF | 90 BPNPNNNPF | 91 BPNNPPPNNF |
| 92 BNNNPPPNF | 93 BPPNPPPNNF | 94 BNNNPNPNF | 95 BPPPNPNPPF |
| 96 BPNNPPNNF | 97 BNNNNPPPF | 98 BNNNPNPNF | 99 BPPPNPPNPF |
| 100 BPNNPPNNPF | 101 BNNNNPNPNF | 102 BPNNPPPNNF | 103 BPPNPPNPPF |
| 104 BPPNNNPNNF | 105 BPPNPPNNPF | 106 BPPNPPPPPF | 107 BNNPNNPNF |
| 108 BPNPNPNPF | 109 BNPNNNPPF | 110 BPNPNPPNF | 111 BPPNNPNNNF |
| 112 BNNPNPPNF | 113 BNNNPPNF | 114 BPNPPPPPF | 115 BNNPNNPNPF |
| 116 BPPNPPPF | 117 BPPPPPPPPF | 118 BPPNPNPPF | 119 BPPPNPPPPF |
| 120 BPPNPPPNNF | 121 BNNPNNNNF | 122 BNNNPPPNPF | 123 BNNNPNPNF |
| 124 BNNNPPPPF | 125 BNPNPPPNF | 126 BNNNPPPPPF | 127 BPPNPPNPF |
| 128 BNNNPNPNF | 129 BNNNPPPPF | 130 BPNNPPPNF | 131 BPNNNPNPF |
| 132 BPNNNPPPF | 133 BNNPPPPPPF | 134 BPPNPPNPPF | 135 BPPNPNPNNF |
| 136 BPPNPPNNF | 137 BPPNPPPPPF | 138 BNNPNNPNNF | 139 BNPNNNNNNF |
| 140 BNNNNPNPF | 141 BNNNNPNNF | 142 BPPNPPNPF | 143 BNNNPNPPF |
| 144 BPPNPPPNNF | 145 BNNNNPPPF | 146 BNNNPNPNF | 147 BNNNNPNNF |
| 148 BPPNPPNNF | 149 BNNNPPPPF | 150 BPNNPPPNNF | 151 BPNNPNPNF |
| 152 BPNNPPNNF | 153 BPNNNNNNNF | 154 BNPPPNNNNF | 155 BNNPPPPPPF |

I4001-0838-(02)HHHH

| | | | | | | | |
|---|---|---|---|---|---|---|---|
| 156 | BPPNPPNPPF | 157 | BPPNPNPNNF | 158 | BPPNPPPNPF | 159 | BPPPNPPPPF |
| 160 | BNNPNNPNNF | 161 | BNPNNNNNNF | 162 | BPPNPPPNNF | 163 | BNNNPNPPNF |
| 164 | BPPNPPNPNF | 165 | BPNPNPPNNF | 166 | BPNNPNPPNF | 167 | BPNNPPPNNF |
| 168 | BPNNPPNPNF | 169 | BPNNNNNNNF | 170 | BNPNPPPNPF | 171 | BNNPPNPNPF |
| 172 | BPPNPPNPPF | 173 | BPNPPPPPPF | 174 | BPNPPPPNPF | 175 | BNPNPPPPPF |
| 176 | BPPNPPPNPF | 177 | BPPNPPPPPF | 178 | BPPNPPNPPF | 179 | BPPNNPPPPF |
| 180 | BPPNPPNNPF | 181 | BPPNNPPPPF | 182 | BNNPNNPNNF | 183 | BNNNNPPPNF |
| 184 | BNPNNNNNNF | 185 | BPPNPPPNNF | 186 | BNNNPNPPNF | 187 | BPPNPPNPNF |
| 188 | BNNNPNPNNF | 189 | BNNNNNPNNF | 190 | BPPNPPNNNF | 191 | BNNNPPPPPF |
| 192 | BPNNPPPNNF | 193 | BPNPPNPNF | 194 | BPNNPPNNNF | 195 | BPNNNNNNNF |
| 196 | BNPNNNPPNF | 197 | BNNPPPPPPF | 198 | BPPNPPNPPF | 199 | BNNNNPPNNF |
| 200 | BPPNPPNPF | 201 | BPPPPPPPF | 202 | BNPNPPNPPF | 203 | BPPNPPPNNF |
| 204 | BNNNPPPPPF | 205 | BPNNPPPNNF | 206 | BPNNNPNPNF | 207 | BNNPPNPNNF |
| 208 | BNNPPPPPPF | 209 | BPPNPPNPF | 210 | BNNNNNPPPF | 211 | BPPNPPPNPF |
| 212 | BPPPPPNPNF | 213 | BPNPPPPNPF | 214 | BNPPNPNPF | 215 | BPPNPPPNPF |
| 216 | BPPNPPPPPF | 217 | BPPNPPNPPF | 218 | BPPPNPNNNF | 219 | BPNPPPPNPF |
| 220 | BNNPPNPNPF | 221 | BPPNPNNNPF | 222 | BNNPNPPPPF | 223 | BPPNPPPNPF |
| 224 | BPPPPNNNPF | 225 | BNPNPNNNPF | 226 | BNPNNPNPPF | 227 | BPPNPPPNNF |
| 228 | BNNNPNPPNF | 229 | BNNNNPNNPF | 230 | BPNNNPNPPF | 231 | BNNNPPNPNF |
| 232 | BNPNNNNNNF | 233 | BPPPNPPNPF | 234 | BNNNNPPPNF | 235 | BNNNNPNNPF |
| 236 | BNPNNNNNNF | 237 | BNNNNPNPNF | 238 | BPNNNNNNPF | 239 | BNNNPNNPNF |
| 240 | BNNNPPPPPF | 241 | BNNNPPNPNF | 242 | BPPNPPPNNF | 243 | BNNNPNPPNF |
| 244 | BNNNNPNPNF | 245 | BNNNNPPPNF | 246 | BNNNPNPNF | 247 | BNNNNPPPNF |
| 248 | BNNNNPNNPF | 249 | BNNNNPNNPF | 250 | BNNNPPPPPF | 251 | BNNPPPPPPF |
| 252 | BPPNPPNPF | 253 | BPPPPPPPPF | 254 | BPPNPPPNNF | 255 | BNNNPNPPNF |

I4001-0839-(03)PPPP

| | | | | | | | |
|---|---|---|---|---|---|---|---|
| 0 | BNNNNPNPPF | 1 | BPPPNNNPPF | 2 | BPPPPPNNPF | 3 | BPNPNPPNPF |
| 4 | BNNPNPNNNF | 5 | BNNPPPPPPF | 6 | BPNPPNPPF | 7 | BNPNPNNPPF |
| 8 | BPNPNPPNPF | 9 | BNNPNNNPNF | 10 | BPPPNNNPF | 11 | BPPPNPPNPF |
| 12 | BPPNPPPNPF | 13 | BPPNNNPNNF | 14 | BPPNPNPPF | 15 | BPPNPPPPPF |
| 16 | BPNPNPPNPF | 17 | BNPPNPPPF | 18 | BPPNPPNPF | 19 | BPPNPPPPPF |
| 20 | BNNPNNPNNF | 21 | BNPNNNNNNF | 22 | BPPNPPPNNF | 23 | BNNNPNPPNF |
| 24 | BPPNPNPPF | 25 | BPPPNNNPF | 26 | BNNNNPNPPF | 27 | BPPPNPNPPF |
| 28 | BPPPNNNNPF | 29 | BNNPPNNNNF | 30 | BPNNPPPNNF | 31 | BPNNNNNNNF |
| 32 | BPPPNPNNPF | 33 | BNNPPPPPPF | 34 | BPPNPPPPPF | 35 | BPPPPNPNPF |
| 36 | BNNPNNNPNF | 37 | BPNPPPPNNF | 38 | BPPPNPNPNF | 39 | BPPNPPPNPF |
| 40 | BPPPNPPPPF | 41 | BPNPPPPNNF | 42 | BPPPNPPPF | 43 | BPPNPPNPNF |
| 44 | BNNNPNPPNF | 45 | BNNNNPNPNF | 46 | BPPPNNPNF | 47 | BPPNNPNPNF |
| 48 | BPNPPPPNNF | 49 | BNNNPNPPNF | 50 | BNNNNPNPNF | 51 | BPPPNNPNPF |
| 52 | BPPNNPNNPF | 53 | BNNPPNNNNF | 54 | BNNPPPPPPF | 55 | BPPNPPPNPF |
| 56 | BPPNPPPPPF | 57 | BPPNPPNPF | 58 | BPPPPPNPF | 59 | BPNPNPPNPF |
| 60 | BNPNPPPPPF | 61 | BNNPNNNNPF | 62 | BNPNNNNNNF | 63 | BNPNPPNPNF |
| 64 | BNNNNPPPF | 65 | BNPNPNPNF | 66 | BPPNPPPPF | 67 | BNNNPNPPNF |
| 68 | BPPPNNNPF | 69 | BPNPPNPNPF | 70 | BNNPNNNNNF | 71 | BNNNPPPPPF |
| 72 | BPNNNNNNNF | 73 | BPPNNNNNNF | 74 | BNNPPPPPPF | 75 | BPPNPNNNF |
| 76 | BNNNPPPPPF | 77 | BPNPNPNPF | 78 | BNNPNNNNNF | 79 | BPPPNPPNPF |
| 80 | BPNPNNNNNF | 81 | BPNPNPPNPF | 82 | BNNPNPPNF | 83 | BPNPNPPNPF |
| 84 | BNNNNPNPF | 85 | BPPNPNNNPF | 86 | BNNPNPPPF | 87 | BPNPNPPNPF |
| 88 | BNNPNNNNNF | 89 | BNNPNPPPF | 90 | BPPNPPNPF | 91 | BPPPNPPPPF |
| 92 | BPPNPPPNNF | 93 | BNNNPNNNF | 94 | BNNPPPPPPF | 95 | BPPNPPNPF |
| 96 | BPPNNPNNPF | 97 | BPPNPPNPF | 98 | BPPPPPNNPF | 99 | BPNPNPPNPF |
| 100 | BNNPPNPNPF | 101 | BNNPNPPPNF | 102 | BPNPPPNNF | 103 | BPNPNNPNPF |
| 104 | BPPNPPPNNF | 105 | BNNNPNPNF | 106 | BNNNNPNPPF | 107 | BPPPNPNPPF |
| 108 | BPNNPNNNPF | 109 | BNNNNPNPPF | 110 | BNNNPPPPPF | 111 | BNNPPPPPPF |
| 112 | BPNPPPPPF | 113 | BPPPNNPNNF | 114 | BPPPPPNNF | 115 | BNNNPNPPNF |
| 116 | BNNNPPPPNF | 117 | BNNNNPNPNF | 118 | BNPNPPPPF | 119 | BNNPPPPPPF |
| 120 | BPNPNPPNPF | 121 | BNNPPPNNPF | 122 | BPPNPPPNPF | 123 | BPPNNPPPPF |
| 124 | BPNPPPNNF | 125 | BPPNPNPNF | 126 | BPPPPPNPF | 127 | BNNNPNNPNF |
| 128 | BPPNPPNPNF | 129 | BNNNPPPPPF | 130 | BPNPPPNNF | 131 | BNNNPNNPNF |

14001-0838-(02)HHHH

| | | | | | | | |
|---|---|---|---|---|---|---|---|
| 132 | BPPPNPNPPF | 133 | BNPPPNPPNF | 134 | BPNNPPNPNF | 135 | BPPNPPNPNF |
| 136 | BNNNPPPPPF | 137 | BPPNPPNPPF | 138 | BPPPPNNPNF | 139 | BPPNPPNPNF |
| 140 | BNNPNPPPPF | 141 | BNNNPPPPPF | 142 | BPNNPPNPNF | 143 | BPPNPPNPNF |
| 144 | BNNPNNPPPF | 145 | BNNNPPPPPF | 146 | BPNPPPPNNF | 147 | BPPNNNPPNF |
| 148 | BPPNPPPNPF | 149 | BPPPPPPPPF | 150 | BPPNPPNPPF | 151 | BPPNNPPPNF |
| 152 | BNPNPPPPPF | 153 | BNNNNPNPNF | 154 | BPPPNPNPPF | 155 | BNPNNNNPNF |
| 156 | BPNNPPPNNF | 157 | BPNNPPNPNF | 158 | BPNPPPPNNF | 159 | BNPNNNNPNF |
| 160 | BPPNPPNPPF | 161 | BNNPPPPNNF | 162 | BPPNPPNNPF | 163 | BPPPPNNPNF |
| 164 | BPPNPPNNNF | 165 | BNNNPNPPNF | 166 | BNNNNPPPNF | 167 | BNPPPPNPNF |
| 168 | BNPNNPNPNF | 169 | BPNPPPPNNF | 170 | BNPNNNPNNF | 171 | BNNPNPNNPF |
| 172 | BNPNNPNPNF | 173 | BNNPNNPPNF | 174 | BNPNNPNPPF | 175 | BPPNPPPNPF |
| 176 | BPPPPNPNF | 177 | BPNPPPPNNF | 178 | BNPNNNNPNF | 179 | BNNPNPNNNF |
| 180 | BPNPPPPNNF | 181 | BNPNPNNPPF | 182 | BNNPNNPPPF | 183 | BPNPPPPNNF |
| 184 | BNPNPNNPPF | 185 | BPPNPPNPPF | 186 | BNNPPNPPNF | 187 | BPPNPPPNPF |
| 188 | BPPPPNPNPF | 189 | BPPNPPNNPF | 190 | BPPNPPPPPF | 191 | BPPNPPNNNF |
| 192 | BNNPNPPPNF | 193 | BNNNPPPNPF | 194 | BPPNPNPPPF | 195 | BPPNNPPPPF |
| 196 | BNNPNPPPPF | 197 | BPPPNPPPNF | 198 | BNNNNNPNPF | 199 | BNPNNNPNPF |
| 200 | BPPPNNPPNF | 201 | BNNPPNPPPF | 202 | BPPNPNPPNF | 203 | BNNNPNPNPF |
| 204 | BNNNNPNPPF | 205 | BPPPNPNPPF | 206 | BNNNNNPNPF | 207 | BNNNNPNPPF |
| 208 | BPPPNNNPPF | 209 | BNNPNPNPNF | 210 | BNPNPPNPNF | 211 | BPNPPPPNNF |
| 212 | BNNNPPPNNF | 213 | BNNNNNPPPF | 214 | BPPPNNNPPF | 215 | BNNNPNNNPF |
| 216 | BNNPNNNPNF | 217 | BNPPPPNPNF | 218 | BPPPNPNPPF | 219 | BNNPNNNNNF |
| 220 | BNNPNNNNNF | 221 | BPNPPPPNNF | 222 | BNNNPPPNNF | 223 | BPPNPNPNPF |
| 224 | BPPPPPPPPF | 225 | BPPNPNPNNF | 226 | BNNNPNPPNF | 227 | BPPNPPPNNF |
| 228 | BNNNPPPPNF | 229 | BPPNPPNNNF | 230 | BNNPNPPPPF | 231 | BNNNPPPNPF |
| 232 | BPPPNPPPNF | 233 | BNNNPNPPPF | 234 | BNNPNPPPNF | 235 | BNNNPPPNPF |
| 236 | BPNPPPPNNF | 237 | BNNPPNPPPF | 238 | BNNNNNPPPF | 239 | BNNNNPPPNF |
| 240 | BNPPPPPNNF | 241 | BPPPNPPNPF | 242 | BNNPNNNPPF | 243 | BNPNNNPNNF |
| 244 | BNPNPPNPPF | 245 | BNPPNNPNNF | 246 | BPPPNPPNPF | 247 | BNNNPPPPNF |
| 248 | BPNPPPPNNF | 249 | BNNPNNNPPF | 250 | BPPNPPNNNF | 251 | BNNNPPPNPF |
| 252 | BNNPPPPPPF | 253 | BPPPPPPPPF | 254 | BPPPPPPPPF | 255 | BPPPPPPPPF |

Cycle clock 307 is of the type well-known in the art and is coupled to pins 6 and 7 of each integrated circuit of the computer to clock the computer through its sequence of operations. Circuit 306 is a power on reset circuit of a type well-known in the art and is coupled to pin 9 of each integrated circuit of the computer.

Read only memory store integrated circuit 302 has outputs 310, 311, 312 and 313 coupled to the multiplex output address lines 230, 231, 232 and 233 hereinbefore mentioned. Even though the central processor unit integrated circuit 301 generates the location addresses placed on these lines, the location address outputs 310–313 are provided on circuit 302 for convenience only. It is at these outputs that the location addresses to which data is to be accessed or sent are established.

Read only memory store integrated circuit 305 has inputs 314, 315, 316 and 317 which receive the data accessed from the multiplex system of FIG. 7 and 8. Inputs 314, 315, 316 and 317 are coupled to the heretofore mentioned input data lines 210, 211, 212 and 213 respectively by inverters 318, 319, 320 and 321 respectively. Although these inputs are located on circuit 305, this is just a convenience of hardware. These inputs in fact are in direct communication with the central processor unit integrated circuit 301 and are not associated with the memory function of circuit 305.

The random access memory integrated circuit 300 has outputs 325, 326, 327 and 328 which provide output data to the multiplex system to be ultimately received by the display memory 22 of FIG. 1. Outputs 325, 326, 327 and 328 are coupled to the output data lines 330, 331, 332 and 333 respectively via NAND gates 334, 335, 336 and 337 respectively.

Figure 11:
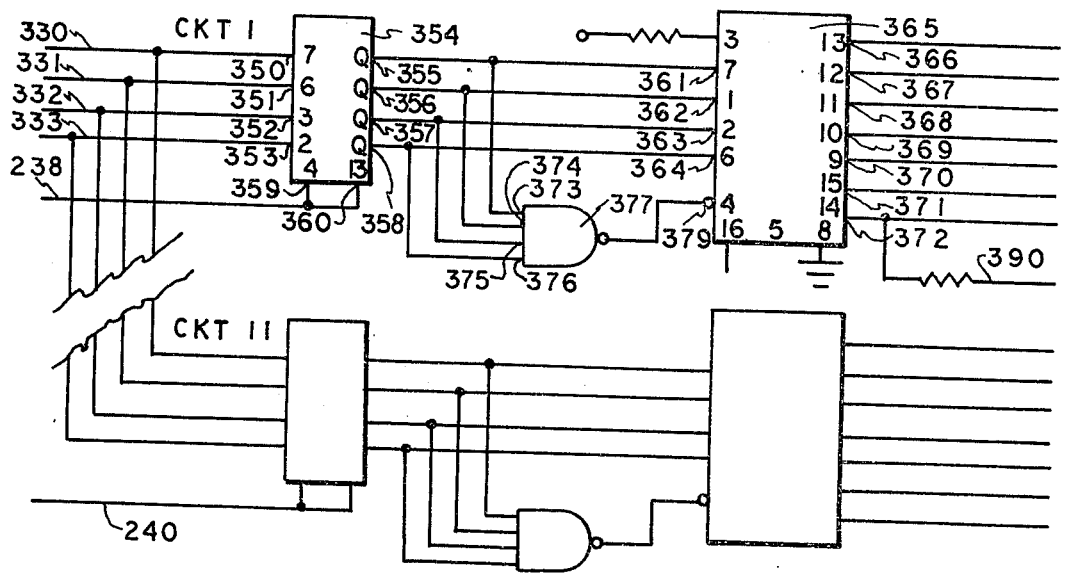
FIG. 11 is a schematic circuit diagram partially in block form showing the display memories and decoders of FIG. 1.

Referring now to FIG. 11, there is shown a circuit diagram partially in block form of the display memory and decoder 22 and display drivers 23 of FIG. 1.

In its preferred form, the digital weighing and computing system of the present invention includes 11 pairs of seven-segment displays, one of each pair arranged for front reading and the other for rear reading, corresponding to four digits for net weight, three digits for price per pound and four digits for total or net price. Each seven-segment display pair has a corresponding display memory and display decoder. The first and last display memories and decoders are shown in detail in FIG. 11. The other display memories and decoders are identical to the display memory and decoder circuits shown in detail.

The output data from the computer is received over the output data lines 330, 331, 332 and 333 which are coupled to inputs 350, 351, 352 and 353 of display memory 354. Display memory 354 is a four-bit memory and may preferably be a standard 7475 integrated circuit. The input data at inputs 350-353 is transferred to the outputs 355, 356, 357 and 358 of display memory 354 in response to a signal received over line 238 which is coupled to the address decoder 234 of FIG. 8. When data is to be displayed on the display, the computer will establish a four-bit binary address on its output address lines 230, 231, 232 and 233 which are decoded by the decoder 234 to establish the enable inputs of the display memories. Display memory 354 has enable inputs 359 and 360 coupled to line 238. Outputs 355, 356, 357 and 358 are coupled to inputs 361, 362, 363 and 364 respectively of decoder 365. Decoder 365 takes the four-bit binary on input 361-364 and decodes the four-bit binary word into a seven-segment decimal at output 366, 367, 368, 369, 370, 371 and 372. Each output is coupled to a respective given one of the segments comprising the seven-segment display for appropriately illuminating the segments to display the proper decimal number. For example, if all seven segments are activated, the display will display an eight for that digit.

The outputs 355, 356, 357 and 358 of display memory 354 are also coupled to inputs 373, 374, 375 and 376 of NAND gate 377. NAND gate 377 has an output 378 coupled to input 379 of decoder 365. When a particular display is to be completely darkened, the computer will provide at the data output lines 330-333 logical ones which will be detected by inputs 373-376 of NAND gate 377 to provide a logical zero at output 378 causing decoder 365 to have all zeros at its outputs to render its associated display completely darkened.

As can be clearly seen from FIG. 11, all of the display memories are connected in common to the data output lines with the other display memories. However, because each display memory is enabled only one at a time, those display memories which are not enabled will ignore any data being received over lines 330-333. In other words, the data over lines 330-333 is sequentially entered into each of the display memories.

Each of the other ten display memory and decoder circuits are coupled to one of the address lines 237, 236, 235, 247, 246, 245, 243, 242, 241 and 240 in that order for being enabled by the computer. Each functions in the same manner as the display memory and decoder just described and corresponds to a given one of the digits of the display.

Figure 12:
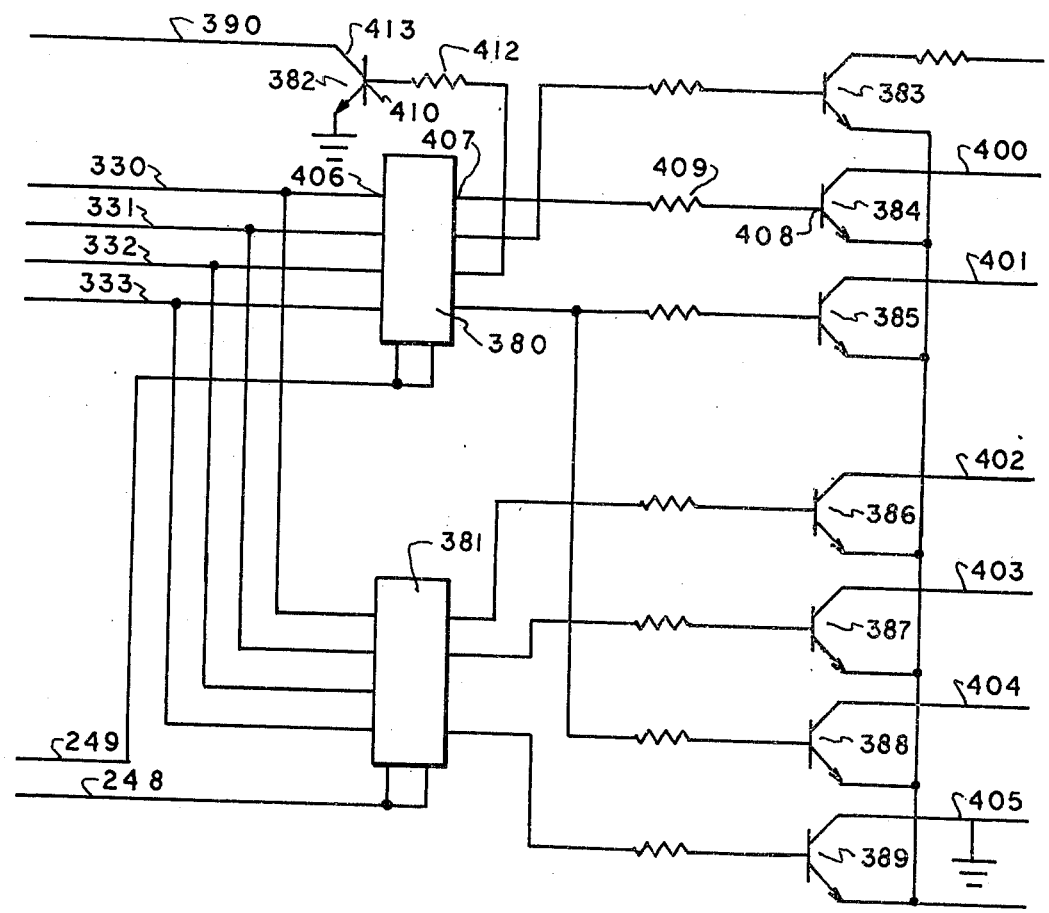
FIG. 12 is a detailed schematic circuit diagram of the remaining portion of the display memory of FIG. 1.

FIG. 12 shows a detailed circuit diagram of a portion of the display memory 22 of FIG. 1 which drives the various lamps on the display. It comprises memories 380 and 381 and transistors 382, 383, 384, 385, 386, 387, 388 and 389.

There are six incandescent lamps associated with the display which illuminate the words net, items one-quarter pound, one-half pound, item and total. The word "net" is illuminated when the scale is displaying a net weight and not an absolute weight. The word "items" is illuminated when the total number of item transactions is desired. The "one-quarter pound" and "one-half pound" words are illuminated when the unit weight price is related to a quarter of a pound and a half pound respectively. The word item is illuminated when the net price of an individul item (weighed or not weighed) is entered into the net price accumulator and the word "total" is illuminated when the price displayed is a total or subtotal price and not the price of an individual item.

Each of the incandescent lamps is coupled to an individual respective one of collectors 400, 401, 402, 403, 404 and 405 of transistors 384, 385, 386, 387, 388 and 389 respectively. Each of the individual lamps is illuminated responsive to the four-bit binary signals on the output data lines 330-333 from the computer. For example, decoder 380 has an input 406 coupled to output data line 330. It also has an output 407 coupled to base 408 of transistor 384 via resistor 409. When the lamp associated with collector 400 of transistor 384 is to be ilumiated, output data line 330 will contain a logical 1 which is transferred from input 406 to output 407 of decoder 380 forward biasing transistor 384. The forward biasing of transistors 384 will cause the lamp coupled to collector 400 to illuminate. The control of the illumination of the other lamps is identical to that previously described for the lamp associated with transistor 384.

Transistor 382 has a base 410 coupled to output 411 of decoder 380 via resistor 412. Transistor 382 has a collector 413 coupled to output 372 of decoder 365 of FIG. 11 via line 390. When the display is to display a negative weight, decoder 380 at output 411 provides a logical 1 forward biasing transistor 382 which causes the center segment of the most significant digit of the weight display to illuminate indicating a negative weight. While a manually entered tare of twenty pounds or greater may be possible, the occurrence of such a tare entry is higly unlikely and therefore there are very few cases where the center segment of the most significant digit of the weight display will be ambiguous.

Figure 13:
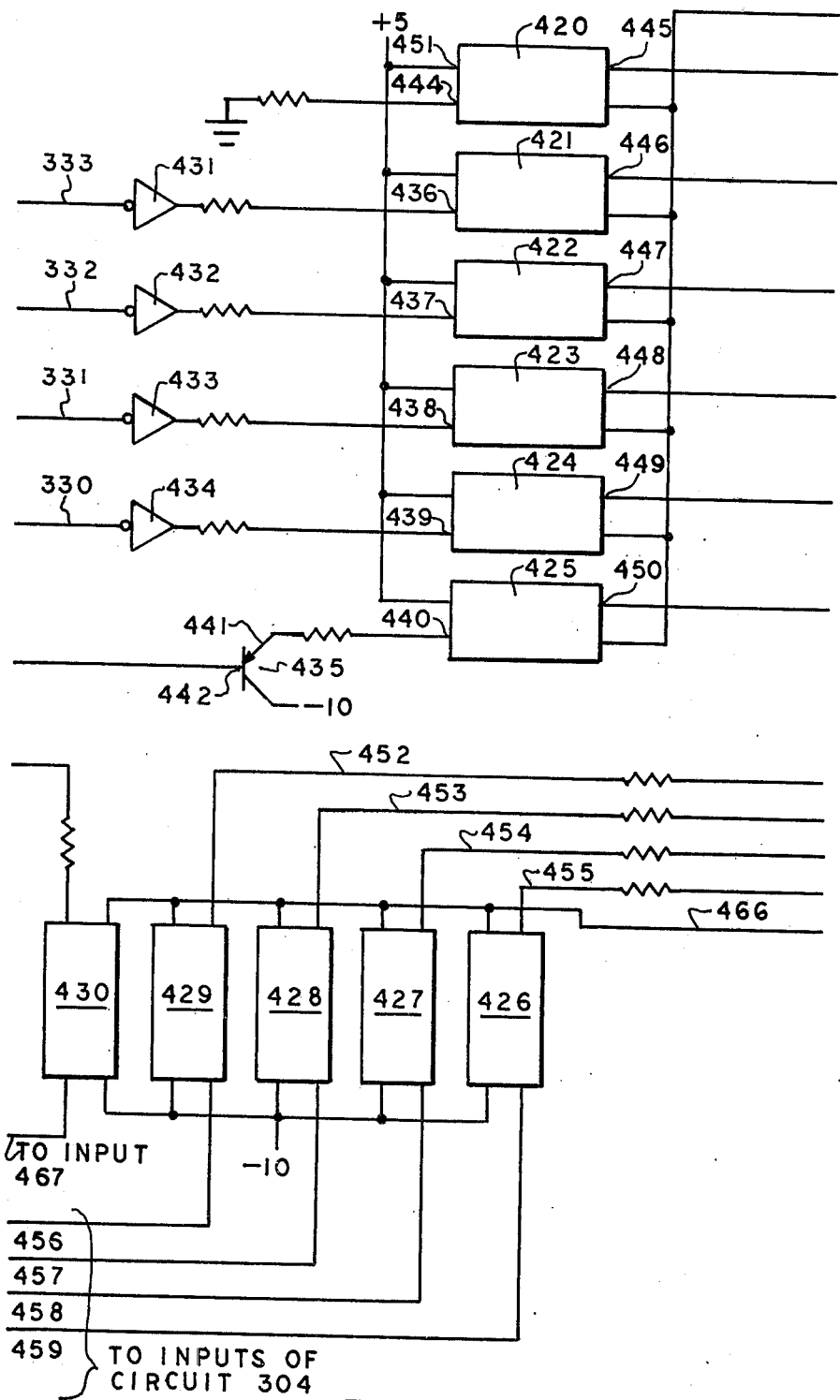
FIG. 13 is a detailed schematic circuit diagram of the printer interface of FIG. 1

FIG. 13 is a detailed schematic circuit diagram of a printer interface which may be utilized in practicing the present invention. It comprises optical isolators 420-430, inverters 431-434 and transistor 435. The optical isolators 420-430 are provided to electronically isolate the printer from the computer so that the operation of the printer does not interfere with the operation of the computer.

Optical isolators 421, 422, 423 and 424 transfer the output data from the computer which is to be printed to the printer. Inputs 436, 437, 438 and 439 of optical isolators 421, 422, 423 and 424 respectively are coupled to a respective given one of the computer output data lines. Input 436 of isolator 421 is coupled to output data line 333 by inverter 431. Input 437 of isolator 422 is coupled to output data line 332 by inverter 432. Input 438 of isolator 423 is coupled to output data line 331 by inverter 433 and input 439 is coupled to data line 330 by inverter 434. Input 440 of isolator 425 is coupled to the emitter 441 of transistor 435. Transistor 435 has a base 442 coupled to output 443 of the read only memory store integrated circuit 303. Input 444 of isolator 420 is coupled to ground.

Outputs 445-450 provide the printer with the data to be printed, a signal indicating that the power to the computer is on, and request and acknowledge signals from the computer. Output 445 responsive to the grounded condition of input 445 and the power supply voltage at input 451 provides a signal at output 445 to indicate to the printer when the power is applied to the computer. Outputs 446, 447, 448 and 449 provide the data received from the output data lines, 333, 332, 331 and 330 respectively. Output 450 provides a signal to the printer responsive to the output 443 of circuit 303 to either request that the printer print or to notify the printer that the data sent to it is valid. The printer communicates with the computer via lines 452, 453, 454 and 455. The printer lines 452, 453, 454 and 455 are coupled to inputs 456, 457, 458 and 459 respectively of circuit 304 by isolators 429, 428, 427 and 426 respectively. The information transferred from the printer to the computer over these lines indicates to the computer which column of data the computer is to transfer to the printer for printing. Line 460 is coupled to input 467 of central processor unit circuit 301 through isolator 430 and carries acknowledge and data request signals from the printer to the computer.

In operation, when a print request is generated by the depression of the print or item key 32 on the keyboard of FIG. 2, the computer at output 433 of circuit 303 will generate a request signal which is conveyed to the printer at output 450 of isolator 425. An acknowledge signal developed by the printer over line 456 within a predetermined time indicates to the computer that the printer is ready for operation. If the computer does not receive the acknowledge signal over line 456 within the predetermined time, it will assume that the printer is in non-operative condition and will abort the print cycle.

After the acknowledge signal on line 456 terminates, the computer receives at inputs 46–459 data from the printer over lines 452–455 indicating the column that the printer is to print so that the computer knows what data it should send to the printer. The printer signals its request for data via line 456. The computer then responds to the information sent over lines 452–455 from the printer and provides at its outputs 325, 326, 327 and 328 the data requested by the printer. This data is sent out on the output data lines 333, 332, 331 and 330 to the isolators 421, 422, 423, and 424 respectively to be received by the printer at outputs 446, 447, 448 and 449. Immediately after sending the data to the printer, the computer generates at output 443 an acknowlege signal which is transferred through transistor 435 to the output 450 of isolator 440 to inform the printer that the data that it has just sent is the data requested by the printer. Thereupon, the printer completes the cycle by sending an acknowledge signal over line 456 evidencing the receipt of the requested data and terminating the request for data previously sent.

Now that one column of data has been set to the printer and printed, the computer waits for further information from the printer to be received over lines 452-455 to determine what the next column of data will be that it will send to the printer. The computer does not generate a request signal again at output 443 because it already knows that the printer is operative.

During the printing cycle, the operation of the other systems coupled to the computer is not affected because the computer will generate a zero address at output 310, 311, 312 and 313 of circuit 302 so that the multiplex system will ignore the data being sent to the printer.

The printer interface circuit just described may be termed a universal printer interface in that it can be used with many different types of printers. By properly designing the electronics of the printer to be used, any printer may be interfaced with the computer for printing purposes. The reason for this is that the printer and computer work in a hand shaking arrangement so that the computer can provide the printer with any information it requests to print.

Another form in which the present invention may take utilizes the same schematic circuit diagram and weighing mechanism as illustrated in FIGS. 1-13 but includes a different hard wired computer configuration of the read only memory store integrated circuits 302, 303, 304 and 305. This embodiment provides for the intermediate single transaction retention of tare and for internally switched options for first retaining a reference weight in the reference weight memory until manually changed, second, for retaining a unit weight price in the unit price memory until manually changed, and third, for requiring a forced pricing decision for unit price.

The intermediate retention of tare allows the operator to place tare materials onto the scale, enter the tare or reference weight for that next immediate transaction, and then remove the tare material for the remote addition of the commodity such as at a slicing machine. The reference weight memory will retain the amount of the tare weight until it has been used for calculating the net weight of the next immediate commodity. The amount of the tare weight retained is displayed as a negative weight during the interval that the tare material is removed from the scale platform and until completion of the first gross weighing, net weight and price determination. Thus, as opposed to the alternate mode of operation, if the tare material is removed prior to the weighing of the first commodity and as the scale reticle goes back through zero, the reference weight memory will not be cleared. The first and second options provide for either or both reference weight, i.e. tare weight, and unit price to be retained for successive weighings until new and changed tare or unit price entries are made by the operator at the keyboard. This is advantageous, for example, where a predetermined tare weight is retained because the tare sheets are identical, regardless of the type and amount of commodity to be weighed, and where repeated entry of the same tare weight for each transaction would by unnecessary and inefficient. The first and second options also make the system suitable for prepacking operations where the same tare weight and unit price are retained for an indeterminate number of commodity weighings.

The third option, when utilized, requires the operator to make a decision upon which the unit price is based, regardless of the unit price base. The system previously described assumed a per lb. basis unless either the one-half or one-fourth lbs. has depressed. The option requires to press one of keys 27, 28, or 20 regardless of the unit weight price.

The system of this embodiment also provides for the latching or holding of the final total price. The initial depressing of the key 30, which now may be referred to as a total/clear key, causes only the total net price and item count to be displayed, but holds this display regardless of further manipulation of the scale. A display lamp may be employed to indicate that the price displayed is a total price. When key 30 is depressed again, the display is unlatched and cleared and the system is ready fo further weighings. Of course, as previously explained, key 32 is used for entering each item net price and for printing same when the system is associated with a suitable printer. In all other respects, except for the way it determines new weights, the system of this embodiment functions in the same manner as the system previously described.

In practicing this embodiment, the net weights are determined by an averaging technique wherein the computer reads the gross weight signals from the weighing mechanism and encoder 10, encoder interface 11, and up/down counter 12 via the multiplex system a fixed number of times during each of a plurality of predetermined time intervals. During each time interval, the gross weight signals are accumulated in the gross weight memory 17. At the end of each time interval, the accumulated gross weights are divided by the number of gross weight signals accumulated to provide an average gross weight signal. Thus the average gross weight signals are spaced apart in time by the predetermined time intervals.

Once an average gross weight is determined, the controller 22 causes the average gross weight in gross weight memory 17 and the reference weight in reference weight memory 16 to be transferred to the subtracter 19 which determines a net weight. Because the division and subtraction occur within a very short time, the net weights provided by subtracter 19 are also spaced apart in time by substantially the predetermined time intervals.

The computer, detects the net weight signals provided by the subtracter. Upon detecting a predetermined number of consecutive net weight signals representing the same net weight, it treats this net weight as a final net weight for use in the same manner as previously described for determining net price etc. The net price for each commodity item in a series is then stored in the net price accumulator 21 and the net weight is stored in the reference weight memory 16.

In its preferred form, the gross weight memory accumulates one hundred gross weights during each predetermined time interval of one-third second. Thus, the weighing mechanism and encoder 10, encoder interface 11, and up/down counter 12 provides gross weight signals at the periodic rate of 300 signals per second. Because exactly one hundred gross weight signals are accumulated during each one-third second interval, the average gross weight is arrived at by merely shifting the decimal point two places or in other words, by ignoring the two least significant digits of the accumulated gross weights. Of course, the number of gross weight samples during the predetermined time intervals may be increased or decreased depending upon the degree of accuracy desired.

It will be immediately evident from the foregoing that this averaging technique, with added provision for dynamic rather than static equilibrium would readily make for 10 or even 100 times better ultimate weight resolution. With means for continued oscillation of the platform and levers and encoder glass or the sensors at nominal equilibrium, resolution may be increased 10 or even 100 times, simply by using rather than ignoring the one or two least significant digits of the accumulated gross weights for computation and display. Except for the foregoing manner of determining final net weight and the other small differences in operation as previously described, the system is unchanged as far as the manner in which net price, total net price etc. are computed.

The computer print out which is required by Intel Corporation for providing the read only memories for this embodiment reads as follows:

```
000 BPNPNPPNNF;   001 BPPPPPPPNF;   002 BPNPNPPNNF;   003 BPNPNPNNNF;
004 BPNPNPPPNF;   005 BNNPNPPNNF;   006 BNPNPPPPPF;   007 BNNNNPNPNF;
008 BPPPNNPNPF;   009 BPPPPPPNPF;   010 BPNPNPPNNF;   011 BPPNNNPPPF;
012 BPPPNNNPPF;   013 BPPPPPPNPF;   014 BPNPNPPNNF;   015 BPNPNNPPNF;
016 BPPNPPPNPF;   017 BPPPNPNPNF;   018 BPPNPPNNPF;   019 BPPPPNNPPF;
020 BPPNPNPPPF;   021 BPPPPNNPPF;   022 BPPNPPPKNF;   023 BNNNPNPPNF;
024 BNNNNPNNPF;   025 BPPPNPPNPF;   026 BPNPPPPPNF;   027 BPNNPPNNPF;
028 BPNNNNPPNF;   029 BPPPNNPPPF;   030 BPNNPPPNNF;   031 BPNNNPNNNF;
032 BPPPNPNPPF;   033 BNNPNNNNNF;   034 BNNNPPNPPF;   035 BNNNPNNPNF;
036 BNNNNPPNPF;   037 BNNNPPNPNF;   038 BPPPNNNPPF;   039 BPPNNPNPPF;
040 BNNNPNNNNF;   041 BPPPNPNPPF;   042 BPPNPNNPNF;   043 BNNNNPPNPF;
044 BNNNPPNNNF;   045 BNNNPNNNPF;   046 BPPPNPNPPF;   047 BPPNNPNPPF;
048 BNNNNPPNPF;   049 BNNNPPNNPF;   050 BPPPNPNPPF;   051 BPNNPPPNPF;
052 BPPNPPPNPF;   053 BPPNNPNNPF;   054 BPNPNPPNNF;   055 BPPNPPNPNF;
056 BPPNPNNNPF;   057 BNNNNNPPPF;   058 BPPPNPNPPF;   059 BPPNNNNPNF;
060 BPNNPNNNNF;   061 BPNPNPPNPF;   062 BNNPNPNNPF;   063 BPNPPPPPNF;
064 BPPPPNNPNF;   065 BNNPNPNPPF;   066 BNNNPPNNNF;   067 BNNNPNNPPF;
068 BNPNNPNNPF;   069 BNNNPPNPPF;   070 BNNNNPNPPF;   071 BPPPNPNPPF;
072 BPNNPNPPPF;   073 BNPPPPNNPF;   074 BPPPNNNPPF;   075 BPNPNPPNPF;
076 BNNNPNNNPF;   077 BPPPNPNPPF;   078 BPPNNPNPPF;   079 BNNPNNPPPF;
080 BPNPPPPPF;    081 BPPNNPPPNF;   082 BNNNPNNPPF;   083 BNNNNPPPNF;
084 BNNNNNPNNF;   085 BPPPNNPNPF;   086 BPNNNNNNPF;   087 BPPPNPNPPF;
088 BNNPPPPPNF;   089 BNNNNNPPPF;   090 BPPPNPNPPF;   091 BNPNNPPNPF;
092 BNNNNNPPPF;   093 BPPNPPNNPF;   094 BPPPPNNPNF;   095 BPPNPPNNNF;
096 BNNNPPPPPF;   097 BPNNPPPNF;    098 BPPNPNNNPF;   099 BNNNPNPPPF;
100 BPNPNPPNPF;   101 BNNPNPNNPF;   102 BPNPPPPPNF;   103 BNNNPNPNPF;
104 BPNPNPPNNF;   105 BPNNNNPPNF;   106 BPNPNPPNNF;   107 BNPNNPNNPF;
108 BPNPNPPNNF;   109 BPNPNNPPNF;   110 BPPNPPPNPF;   111 BPPPNNPPPF;
112 BPPNPPPNNF;   113 BNNNPNPPNF;   114 BPPPNNNPPF;   115 BPNNPNNPPF;
116 BPPNPPPNPF;   117 BPPNNPPPPF;   118 BPNPNPPNPF;   119 BNNNNPPPNF;
120 BNNNPPNPPF;   121 BNNNNPNPNF;   122 BPNPNPPNNF;   123 BPNNNNPPNF;
124 BPNPPPPPF;    125 BPPPPNNNPF;   126 BNPNNNPNPF;   127 BNNNPNNNPF;
128 BNPNNNPPPF;   129 BNNPNNPPPF;   130 BNNNPPNNPF;   131 BPPNPNNNPF;
132 BNNNPPPPPF;   133 BPNPNPPNPF;   134 BNNPNPNNPF;   135 BNNNPNNPNF;
136 BPPPNNNPPF;   137 BPPPPNNNPF;   138 BNPNPNPPPF;   139 BPPPNNNPPF;
140 BPPNPPNNNF;   141 BPPPNPPNPF;   142 BNNPNNPNNF;   143 BPNPNPPNPF;
144 BNNNPNPPNF;   145 BPNPNPPPNF;   146 BNNPNNPNNPF;  147 BPPNPNNNPF;
148 BNNPPNPPPF;   149 BPNPNPPNPF;   150 BNNPNPNNPF;   151 BNNNPNNNPNF;
152 BPPNPPPNPF;   153 BPPPPNPNPF;   154 BNPNNNNNNF;   155 BPPNPPPNNF;
156 BNNNPNPPNF;   157 BNPNNNPNPF;   158 BNNNPPPPPF;   159 BPNNPPPNNF;
```

| | | | |
|---|---|---|---|
| 160 BPNNNNNNF; | 161 BNPPNNPNNF; | 162 BNPNPPPNPF; | 163 BPNPPPPPNF; |
| 164 BPNPNNPNPF; | 165 BPNPNPPNPF; | 166 BNNNNNPNNF; | 167 BPPPNNPNPF; |
| 168 BNPPNPNNNF; | 169 BPPNPPPNPF; | 170 BPPNNPNNPF; | 171 BNNPNNNPPF; |
| 172 BPNPPPPPPF; | 173 BNPPNNPNPF; | 174 BPNPNPPPNF; | 175 BNPNNNPNPF; |
| 176 BPNPPPPPNF; | 177 BPNPNNNNPF; | 178 BPNPNPPNNF; | 179 BPPPPNNPPF; |
| 180 BPPPNNNNPF; | 181 BNPNPNNNPF; | 182 BPNPNPPNNF; | 183 BNNNNNPNNF; |
| 184 BPNPNPPPNF; | 185 BNNPNPPNNF; | 186 BNNNPPNNPF; | 187 BPPNPNNNPF; |
| 188 BNNNPNPPNF; | 189 BPNPNPPNPF; | 190 BNNPNPNNPF; | 191 BPNPPPPPNF; |
| 192 BPNPNNNPPF; | 193 BPNPNPPNNF; | 194 BPPPPNNPPF; | 195 BPPPNPNPPF; |
| 196 BNNNPPNPPF; | 197 BPPPNPPNPF; | 198 BNNNPPPNPF; | 199 BPNPNPPNNF; |
| 200 BPPNPPNNF; | 201 BPPPNNNPPF; | 202 BNNPPNNNNF; | 203 BPNPNPPNPF; |
| 204 BNPPNPNNNF; | 205 BPNPPPPPNF; | 206 BPPPPNNPNF; | 207 BPPNPPPNPF; |
| 208 BPPPPNPNF; | 209 BPPNPPPNNF; | 210 BNNNPNPPNF; | 211 BNNNNPNPPF; |
| 212 BPPPNPNPPF; | 213 BNNPPNNPNF; | 214 BPNPNPPNPF; | 215 BNPNNNPPPPF; |
| 216 BPNPNPPNPF; | 217 BNPNNNNNPF; | 218 BPNPNPPNNF; | 219 BNPPNPNNNF; |
| 220 BPPNPPNNF; | 221 BNPNPPPNNF; | 222 BPNPNPPNNF; | 223 BNPNNNNPPF; |
| 224 BPNPPPPPNF; | 225 BPPPPPPPNF; | 226 BPNPPPNPF; | 227 BNPNNPNPPF; |
| 228 BPNPNPPNPF; | 229 BNNNPNNNNF; | 230 BPPNPPPNPF; | 231 BPPPPNPNPF; |
| 232 BPNPPNPPF; | 233 BPPNPPPPPF; | 234 BNNPNNNPNF; | 235 BPPNPPPNNF; |
| 236 BNNNPPNNNF; | 237 BPNPNPPNPF; | 238 BNPNPPPNPF; | 239 BPNPNPPNPF; |
| 240 BNPNNNNPPF; | 241 BPNPNPPNNF; | 242 BPPNPPNNF; | 243 BPPPNNNPPF; |
| 244 BNNNNNPNNF; | 245 BPNPNPNNNF; | 246 BPNNNNPPNF; | 247 BPNPNPPNNF; |
| 248 BNPNNNPNF; | 249 BPNPPPPPNF; | 250 BPPPPNNPNF; | 251 BPNPNPPNNF; |
| 252 BNPNNNNPPF; | 253 BPPNPPNPPF; | 254 BNNNNPNNPF; | 255 BPNPNPPNNF; |

| | | | |
|---|---|---|---|
| 000 BPPPPPPNNF; | 001 BPPNPPPNPF; | 002 BPPPPNNPNF; | 003 BPPNPNNNPF; |
| 004 BNNPPNPPNF; | 005 BPNPNPPNPF; | 006 BNNPNNPPPF; | 007 BNPNNNNNNF; |
| 008 BPPNPPPNPF; | 009 BPPNNPPPPF; | 010 BPPNPPPNNF; | 011 BPNPNPPNPF; |
| 012 BPNNNNNNPF; | 013 BPPNPPPNPF; | 014 BPPPPNPNPF; | 015 BPPNPPNPPF; |
| 016 BPNPNPNPNF; | 017 BNNPNNNPNF; | 018 BPNPNPPNPF; | 019 BNPNPPNPPF; |
| 020 BPNPNPPNPF; | 021 BNNPNPNNNF; | 022 BPPPNNPNPF; | 023 BPNPPPNPPF; |
| 024 BPPNPPNPPF; | 025 BPPPNPPPPF; | 026 BPNPNPPNNF; | 027 BNPNNPPPPF; |
| 028 BPNPNPPNNF; | 029 BPPPNNPPF; | 030 BPNPNPPNNF; | 031 BPNNPNPNNF; |
| 032 BNPNPPPPPF; | 033 BPPNPPPNPF; | 034 BPPNPPPNF; | 035 BPPPNPNPPF; |
| 036 BPPNPNPPNF; | 037 BPNPNPPNNF; | 038 BPNNPNPNNF; | 039 BPPNPPPNPF; |
| 040 BPPNPPNPF; | 041 BPPNPPPNNF; | 042 BNNNNPPNF; | 043 BNNNPNPNF; |
| 044 BNNNNPNPF; | 045 BPPNPPNPF; | 046 BPNPPPPNPF; | 047 BPPPNNNPPF; |
| 048 BPPNNNPNF; | 049 BNPNPPPNNF; | 050 PNNNNNPPPF; | 051 BPPPNNPNF; |
| 052 BPNPPPPNPF; | 053 BNPNPPNNF; | 054 BPPNPPNNF; | 055 BNNNPNPNF; |
| 056 BPNPPPPPNF; | 057 BPPNPNNNNF; | 058 BPNPNPPNF; | 059 BPPPPPPPNF; |
| 060 BPPNPPPNPF; | 061 BPPPPPNNF; | 062 BPNPNPNPF; | 063 BPNPNPNPPF; |
| 064 BPNPPPPNPF; | 065 BPPPNPNPPF; | 066 BPPNPPPNF; | 067 BPPPPPPNNF; |
| 068 BPNPPPNNF; | 069 BNNPNNNNF; | 070 BNNNPPPNF; | 071 BNNNPNPPPF; |
| 072 BPPPNNNPPF; | 073 BPNPNPPNF; | 074 BPPNPPPNPF; | 075 BPPNPPNPF; |
| 076 BPPNPPNPPF; | 077 BPPPPNPNPF; | 078 BNNPNNNNF; | 079 BPNPNPPNPF; |
| 080 BNPNPPNPF; | 081 BPNPNPPNF; | 082 BNNPNPPNNF; | 083 BNNNPNNNF; |
| 084 BPPPNNNPPF; | 085 BNNPNPPNF; | 086 BPNPNPPNPF; | 087 BPNNPPNNPF; |
| 088 BPPPNPPNF; | 089 BPNPNNNNPF; | 090 BPPNPNPPF; | 091 BNNPNPPPNF; |
| 092 BPNPNPPNPF; | 093 BNPPNNNPNF; | 094 BPPPPNPF; | 095 BPPNPNPNNF; |
| 096 BPPNPPNPPF; | 097 BPPNNPNNPF; | 098 BPPNPPNNF; | 099 BPPNPNPNNF; |
| 100 BPNPNPPNPF; | 101 BNPPPNPNNF; | 102 BPNPNPPNNF; | 103 BPPPPNNPPF; |
| 104 BPPNPPPNPF; | 105 BPPNPPNNF; | 106 BPNPNPPNF; | 107 BPPPNNNPF; |
| 108 BPPPNPNPPF; | 109 BNNNPPNPNF; | 110 BPPNPPPNF; | 111 BPPPPNNPNF; |
| 112 BPNPNPPPNF; | 113 BNNPNNPNNF; | 114 BPNNPPPNNF; | 115 BPNPNPPPNF; |
| 116 BNNPNNPNNF; | 117 BPPNPPPNPF; | 118 BPPNPNNNNF; | 119 BPPNPPPNNF; |
| 120 BNNNPNPPNF; | 121 BNNNNPNPF; | 122 BPPPPNPNF; | 123 BNPPPPPPF; |
| 124 BPPNPPPNPF; | 125 BPPNPPNNF; | 126 BPNPPPPNF; | 127 BNPPNPNPF; |
| 128 BPPNPNNNPF; | 129 BNNPNNNPF; | 130 BPNPPPNNF; | 131 BNNPNPNNF; |
| 132 BPPNPPNPF; | 133 BPPNPNNNF; | 134 BPPNPPNPF; | 135 BNPPPPNNNF; |
| 136 BPPNPPNPF; | 137 BPNPNPPPPF; | 138 BPPNPPNPF; | 139 BPPPPPPPF; |
| 140 BPNPNPPNNF; | 141 BPNPPPPPF; | 142 BPPNPNPPF; | 143 BNNNNNPNNF; |
| 144 BPNPNPPNPF; | 145 BNNNPNPNNF; | 146 BPNPNPPNNF; | 147 BPPPNPNPPF; |

| | | | |
|---|---|---|---|
| 148 BPPPNNNPF; | 149 BNPNNNNPPF; | 150 BPNPNPPNPF; | 151 BNNPNPNPPF; |
| 152 BNNNPNNPNF; | 153 BPPPNPNPPF; | 154 BNPNPNPPPF; | 155 BPPNPPNPPF; |
| 156 BPPPNNNNPF; | 157 BPPNPPNPNF; | 158 BNNNPNPPNF; | 159 BPPNPPPNNF; |
| 160 BPPPNPNPPF; | 161 BNPNPPNNPF; | 162 BNNNPPNPNF; | 163 BNNNPNPPNF; |
| 164 BPPNPPPNNF; | 165 BNNNPPPPPF; | 166 BNNNPPNPNF; | 167 BNPNNPPNPF; |
| 168 BPNPNPPNPF; | 169 BNNNPNPNPF; | 170 BPNPNPPNNF; | 171 BPPNNNPPPF; |
| 172 BPPPNNNNPF; | 173 PNPNNNNPPF; | 174 BPNPNPPNPF; | 175 BNNPNPNPPF; |
| 176 BNNNPNNNNF; | 177 BPPNNPNPPF; | 178 BNPNNNNPPF; | 179 BNNPNPPPPF; |
| 180 BNNNPPNNNF; | 181 BNPNPPPPPF; | 182 BNNNNPNNNF; | 183 BNNNNPNPNF; |
| 184 BPPPNPPNPF; | 185 BNPNNNNPPF; | 186 BPNPNPPNPF; | 187 BNNNNNPNNF; |
| 188 BPNPNPPNPF; | 189 BNNNNPNPNF; | 190 BNNNNPPNPF; | 191 BNNNPPNPNF; |
| 192 BPPNPPPNPF; | 193 BPPNPNPNPF; | 194 BPPNPPPNNF; | 195 BNNNPNPNPNF; |
| 196 BNNNPPPPPF; | 197 BPNPPPPNPF; | 198 BPPNNPPPPF; | 199 BPNPNPPNNF; |
| 200 BPPNPPNPNF; | 201 BPPPNPNPPF; | 202 BNNPNPPPNF; | 203 BPPNPPPNPF; |
| 204 BPPPNNPNF; | 205 BPPNPNNNPF; | 206 BNNPNNPPNF; | 207 BPNPNPNPPF; |
| 208 BNNPNNPPPF; | 209 BPNPPPPPPF; | 210 BPPPNNNNPF; | 211 BPPNPPNPF; |
| 212 BPPPNNPNNF; | 213 BPPNPPPNNF; | 214 BNNNPNPNNF; | 215 BNNNPPPNF; |
| 216 BNNNNPNPNF; | 217 BNPNNPPPPF; | 218 BNNPPPPPPNF; | 219 BPPNPPPNNF; |
| 220 BNNNPNPPNF; | 221 BNNNNPNPNF; | 222 BNNNNPPPNF; | 223 BNNNNPNPNF; |
| 224 BNNNNPPPNF; | 225 BNNNNPNNPF; | 226 BNNNNPNNPF; | 227 BNNNPPPPPF; |
| 228 BNNPPPPPPF; | 229 BPNPNPPPNF; | 230 BNNPNPNNNF; | 231 BNNNPNNNPF; |
| 232 BPPPNNNPPF; | 233 BNPNNNNPPF; | 234 BPNPNPPNPF; | 235 BNNNNPNPNF; |
| 236 BPNPNPPNNF; | 237 BPPPPNNPPF; | 238 BPPPNPNNPF; | 239 BNPNNNNPPF; |
| 240 BPPNPNNNPF; | 241 BNNNNPPPPF; | 242 BPNPNPPNPF; | 243 BNNNPNPNNPF; |
| 244 BNNNPNNNF; | 245 BNNNNPPNNF; | 246 BPNPNPPNNF; | 247 PPPNNPNNF; |
| 248 BPPPNPNPPF; | 249 BNPNNNNPPF; | 250 BPPNPPPNPF; | 251 BPPPPNNPNF; |
| 252 BPPNPPNPPF; | 253 BPPPNPNPNF; | 254 BPNPNPPNPF; | 255 BNPNPPPNF; |
| | | | |
| 000 BPPNPPNPNF; | 001 BNNNPNPPNF; | 002 BNPPPPPPNF; | 003 BPPPNPNPPF; |
| 004 BPNNPPNPPF; | 005 PPPNPPPNPF; | 006 BPPPNPNNNF; | 007 BPPNPPNPPF; |
| 008 BPPPPPNPPF; | 009 BPPNPNNPPF; | 010 BNNPNPPPPF; | 011 PNNNNPPPNF; |
| 012 BPPNPPPNNF; | 013 BNNNPNPNF; | 014 BNNNNPNNF; | 015 BNPNNNNNNF; |
| 016 BNNNNPNNNF; | 017 BNPNNPNPPF; | 018 BNNNNPNNPF; | 019 BPPPNNPNPF; |
| 020 BPPPNPNNPF; | 021 BNPPPPNPNF; | 022 BNPPPNNNNF; | 023 BNNNPPPPPF; |
| 024 BPPPNPNPPF; | 025 BPPPNNPNNF; | 026 BPNNPNNPNF; | 027 BNPNNPPNNF; |
| 028 BNNNNPPPF; | 029 BNPNNPPNNF; | 030 BPNNNNNPPF; | 031 BPPPPNPNNF; |
| 032 BNPNPPNPPF; | 033 BPPPNPNPPF; | 034 BPPNPNNPPF; | 035 BPPNPPNPF; |
| 036 BPPNPPPPPF; | 037 BPPNPPNPF; | 038 BPPNPNPPPF; | 039 BPPNPPNNF; |
| 040 BPPNPNPPPF; | 041 BNNNPNNPPF; | 042 BPNPNPPNPF; | 043 BNNPPPNNF; |
| 044 BNPNPNNPNF; | 045 BPPPNPNPPF; | 046 BPPNNPNPPF; | 047 BNNPNNPPPF; |
| 048 BPNPNPPNNF; | 049 BPNNPNNPPF; | 050 BPNPPPPNPF; | 051 BPPPPPNNF; |
| 052 BPPNPPPNPF; | 053 BPPPPNNPNF; | 054 BPPNPPNNF; | 055 BNNNPNPNF; |
| 056 BNNNPNPNF; | 057 BNNNNPPNF; | 058 BNNNNPNNF; | 059 BPPPNPNNF; |
| 060 BPNPPPNNPF; | 061 BNPNNPPNNF; | 062 BPPNPPNNF; | 063 BPPNPNPPF; |
| 064 BNNPNNPPPF; | 065 BPNPNPPNNF; | 066 BPNNPNNNF; | 067 BNPNPPNNF; |
| 068 BPNPPPPNPF; | 069 BPPNNNPNPF; | 070 BPPNPPPNF; | 071 BPPNPNPPNF; |
| 072 BNPNPPPPPF; | 073 BNNNNPNNF; | 074 BNNNNPNNF; | 075 BPPPNNNPF; |
| 076 BPNPPNNNF; | 077 BPNNPPPNF; | 078 BNNNNPPNF; | 079 BPPNPPPNNF; |
| 080 BNNNPNPPNF; | 081 BPPPNPNPF; | 082 BPNPNNPPF; | 083 BNNNNPPPF; |
| 084 BNNNNPNPNF; | 085 BPPNPNPPF; | 086 BPNPNNPPF; | 087 BNNNPNPNF; |
| 088 BPNNPPPNNF; | 089 BPPNPPNPF; | 090 BPPNNNPNF; | 091 BPPNPPNNF; |
| 092 BPPNPPPPPF; | 093 BNNPNNPNNF; | 094 BPNPNPNPF; | 095 BNNPPPNNF; |
| 096 BPNPNPPNNF; | 097 BPPNNNNPF; | 098 BNNPNPPNF; | 099 BNNNPPNPNF; |
| 100 BPNPPPPNPF; | 101 BNPNNNNPPF; | 102 BPPNPPPNPF; | 103 BPPPNPNPF; |
| 104 BPPNPPPNNF; | 105 BNNNPNPPNF; | 106 BNNNPNNPF; | 107 BNNPNPPPPF; |
| 108 BPPPNNPNF; | 109 BPNNPNNNNF; | 110 BNNPNNPNF; | 111 BPNNPPPNNF; |
| 112 BPPNPPPNNF; | 113 BNNNPPPPPF; | 114 BPNPPPNPF; | 115 BPPNPPPNNF; |
| 116 BNNNPPPPPF; | 117 BPPNPPNPF; | 118 BPPPNPPPPF; | 119 BPPNPPNPF; |
| 120 BPPNPNPNF; | 121 BPPNPPNNF; | 122 BPPNPNPNF; | 123 BNNPNNPNF; |
| 124 BPNPNPPNPF; | 125 BNNPPPNPNF; | 126 BNNNPNNPPF; | 127 BNNNNPPNF; |

| | | | |
|---|---|---|---|
| 128 BNNNNNPNNF; | 129 BNNNPPNPFF; | 130 BNNNPNNPNF; | 131 BNPPPNNNNF; |
| 132 BNNNNNPNNF; | 133 BNNNPPNPNF; | 134 BNNPPPPPF; | 135 BPPNFPNPPF; |
| 136 BPPNPNPNNF; | 137 BPPNPPNNPF; | 138 BPPNPPPPPF; | 139 BNNPNNPNNF; |
| 140 BNPNNNNNF; | 141 BNNNNNPNPF; | 142 BNNNNNPPNF; | 143 BPPNPPNPNF; |
| 144 BNNNPNPPPF; | 145 BPPNPPPNNF; | 146 BNNNNPPPNF; | 147 BNNNPNPNNF; |
| 148 BNNNNNPNNF; | 149 BPPNPPNNNF; | 150 BNNNPPPPPF; | 151 BPNNPPPNNF; |
| 152 BPNNPPNPNF; | 153 BPNNPPNNNF; | 154 BPNNNNNNF; | 155 BNPPPNNNPF; |
| 156 BNNPPPPPPF; | 157 BPPNPPNPPF; | 158 BPPNPNPNNF; | 159 BPPNPPPNPF; |
| 160 BPPPNPPPPF; | 161 BNNPNNPNNF; | 162 BNPNNNNNNF; | 163 BPPNPPPNNF; |
| 164 BNNNPNPPNF; | 165 BPPNPPNPNF; | 166 BNNNNPNPPF; | 167 BPPPNPNPPF; |
| 168 BNPNPNPNPF; | 169 BNNNNPNPPF; | 170 BNNNPPPPPF; | 171 BPNNPPPNNF; |
| 172 BPNNPPNPNF; | 173 BPNNNNNNNF; | 174 BNPNPPPNNF; | 175 BNNPPNPNPF; |
| 176 BPPNPPNPPF; | 177 BPPNPPPPPF; | 178 BPNPPPNPNF; | 179 BNPNPPPPNF; |
| 180 BPNPNPPNPF; | 181 BPNNPPNNPF; | 182 BPPPNNPNPF; | 183 BNPNNPNPPF; |
| 184 BPPNPPPNPF; | 185 BPPNPNPNNF; | 186 BPPNPPNPPF; | 187 BPPNNPNNPF; |
| 188 BPNPPPPNPF; | 189 BNPNPPPPNF; | 190 BPPNPPNPPF; | 191 BPPNPPPPPF; |
| 192 BPPNPPNPPF; | 193 BPPNNPPPPF; | 194 BPPNPPNNPF; | 195 BPPNNPPPPF; |
| 196 BNNPNNPNNF; | 197 BNNNNPPNPF; | 198 BNPNNNNNNF; | 199 BPPNPPPNNF; |
| 200 BNNNPNPPNF; | 201 BPPNPPNPNF; | 202 BNNNPNPNNF; | 203 BNNNNNPNNF; |
| 204 BPPNPPNNNF; | 205 BNNNPPPPPF; | 206 BPNNPPPNF; | 207 BPNNPPNPNF; |
| 208 BPNNPPNNNF; | 209 BPNNNNNNNF; | 210 BNNPPPNNNF; | 211 BNNPPPPPPF; |
| 212 BPPNPNNNPF; | 213 BNNPNPPPPF; | 214 BPPNPPPNPF; | 215 BPPPPNNNPF; |
| 216 BNPNPNNNPF; | 217 BNPNNPNPPF; | 218 BPPNPPPNNF; | 219 BNNNPNPPNF; |
| 220 BNNNNPNNPF; | 221 BPNNNPNPPF; | 222 BNNNPNNPPF; | 223 BNPNNNNNNF; |
| 224 BPPPNPNPPF; | 225 BNNNPNPPPF; | 226 BNNNNPNNPF; | 227 BNPNNNNNNF; |
| 228 BNNNNPNPNF; | 229 BPNNNNNNPF; | 230 BNNNPPNPPF; | 231 BNNNPPPPPF; |
| 232 BNNPPPPPPF; | 233 BPPNPPNPPF; | 234 BNNNNPPPPF; | 235 BPPNPPPNPF; |
| 236 BPPPPNPNF; | 237 BPNPPPNNNF; | 238 BPPPPPNPNF; | 239 BPPNPPNPPF; |
| 240 BPPNPPPPPF; | 241 BPPNPNPPF; | 242 BPPPPNPNNF; | 243 BPNPPPPNNF; |
| 244 BPPPPPNPNF; | 245 BPPNPPNPPF; | 246 BPPNPPPPPF; | 247 BPPNPPNPPF; |
| 248 BPPPPPPPPF; | 249 BPNPPPPNNF; | 250 BPPPPNPNF; | 251 BPPNPPNPF; |
| 252 BPPNNPNNPF; | 253 BPPNPPNPPF; | 254 BPPPPPNNPF; | 255 BPNPPPPNNF; |
| | | | |
| 000 BPPPPNPNF; | 001 BPPNPPNPF; | 002 BNNNPPNNF; | 003 BPPNPPPNPF; |
| 004 BPPPPPPPPF; | 005 BNPNPPNPF; | 006 BPPNPPPNNF; | 007 BNNNPPPPPF; |
| 008 BPNNPPPNNF; | 009 BPNNNPNPF; | 010 BPPPPPNNPF; | 011 BNNPPPPPPF; |
| 012 BPPNPPPNPF; | 013 BPPPPPPPPF; | 014 BPPNPPPNNF; | 015 BNNNPNPPNF; |
| 016 BNNNNPNPPF; | 017 BPPPNNNPPF; | 018 BPPPNPNNNF; | 019 BPNPNPPNF; |
| 020 BNNNPNNNNF; | 021 BNNPPPPPPF; | 022 BPNPNPPNPF; | 023 BNPNNPPPPF; |
| 024 BPNPNPNNPF; | 025 BNNNPNNPPF; | 026 BPPNNPNPF; | 027 BPPNPPNNF; |
| 028 BPPNPPPNPF; | 029 BPPNNNPNNF; | 030 BPPNPPNPPF; | 031 BPPNPPPPPF; |
| 032 BPNPNPPNPF; | 033 BNPPPNPNF; | 034 BNNNNNPNPF; | 035 BPPNPPPNPF; |
| 036 BPPNPPPPPF; | 037 BNNPNNPNNF; | 038 BNPNNNNNNF; | 039 BPPNPPPNNF; |
| 040 BNNNPNPPNF; | 041 BPPPNPNPPF; | 042 BPPNPNNNNF; | 043 BNNNNPNPF; |
| 044 BPPNPNPPF; | 045 BPPNPNNNNF; | 046 BNNPPNNNNF; | 047 BPNNPPNNF; |
| 048 BPNNNNNNNF; | 049 BPPNPPNNNF; | 050 BNNPPPPPPF; | 051 BPPNPPPPF; |
| 052 BPPPNPNPF; | 053 BNNPNNNPNF; | 054 BPNPPPPNNF; | 055 BPPNPNNNF; |
| 056 BPPNPPPNPF; | 057 BPPPNPPPPF; | 058 BPNPPPPNNF; | 059 BPPNPPNPNF; |
| 060 BPPNPPPNPF; | 061 BPPNPPPPPF; | 062 BPPNPPNPPF; | 063 BPPPPPNPNF; |
| 064 BPNPNPNPF; | 065 BNPNPPPNF; | 066 BNNNPNPNF; | 067 BPPPNNNPPF; |
| 068 BPNPNPPPPF; | 069 BNPNPPNPNF; | 070 BNNNNNPPF; | 071 BNNNNPPPF; |
| 072 BNPNNPNPNF; | 073 BPPNPPNPNF; | 074 BNNNPNPNF; | 075 BPPPNNNPPF; |
| 076 BPNPPNNNNF; | 077 BNNPNNNNNF; | 078 BNNNPPPPPF; | 079 BNNPPPPPPF; |
| 080 BPNPNPPNPF; | 081 BNNNPNPNF; | 082 BPPNPPPNPF; | 083 BPPPPNPPPF; |
| 084 BPPNPPPNNF; | 085 BNNPNNNNPF; | 086 BNNNPPPPPF; | 087 BPNPNPNNF; |
| 088 BPNPNNPPNF; | 089 BPNPPPNPF; | 090 BPPPPPPPPF; | 091 BPPNPPNPPF; |
| 092 BPPNPPPPPF; | 093 BPPNPPPNNF; | 094 BNNPNNNNNF; | 095 BNNNPNPPF; |
| 096 BNNPNPNNF; | 097 BNNNPPPNF; | 098 BNPNPPPNPF; | 099 BNNNPPNPF; |
| 100 BPPNPPNPNF; | 101 BNNNPNPNPF; | 102 BNNNPPPPPF; | 103 BPNNPPPNNF; |
| 104 BPNNNPNNF; | 105 BPNPNNNNF; | 106 BNNPPPPPPF; | 107 BNNPNPNNF; |
| 108 BPPNPPPNPF; | 109 BPPNPPPPPF; | 110 BNPNNNNNNF; | 111 BNNNNPPNF; |
| 112 BPPNPPPNNF; | 113 BNNNPNPNF; | 114 BNNNPNPNNF; | 115 BNNNNPPNF; |
| 116 BNNNPPPPPF; | 117 BPNNPPPNNF; | 118 BPNNNNNNF; | 119 BPNNNPPPF; |

| | | | |
|---|---|---|---|
| 120 BNNPPPPPF; | 121 BPNPNPPNNF; | 122 BPPPPPPPNF; | 123 APPNPPPNPF; |
| 124 BPPNNPPPPF; | 125 APPNPPPNNF; | 126 BPPNPPNPPF; | 127 APPPPPPNPF; |
| 128 BNNNPNNPPF; | 129 BPPNPPNPNF; | 130 BNNNPPPPPF; | 131 APPNPPPNNF; |
| 132 BNNNPNNPNF; | 133 BPPPNPNPPF; | 134 ANPPPNPNPF; | 135 APNNPPNPNF; |
| 136 BPPNPPNPNF; | 137 BNNNPPPPPF; | 138 BPPNPPNPPF; | 139 BPPPPNNPNF; |
| 140 BPPNPPNPNF; | 141 BNNPNPPPPF; | 142 BNNNPPPPPF; | 143 APNNPPNPNF; |
| 144 BPPNPPNPNF; | 145 BNNPNNPPPF; | 146 BNNNPPPPPF; | 147 PPNPNPPNNF; |
| 148 PPPNNNNNPF; | 149 BPNPPPPNNF; | 150 BPNPNNPPNF; | 151 APPNPPPNPF; |
| 152 APPPPPPPPF; | 153 APPNPPNPPF; | 154 BPPNNPPPNF; | 155 BNPNPPPPPF; |
| 156 BNNNNPNPNF; | 157 APPPNPNPPF; | 158 BNNPPPPPPF; | 159 PPNNPPPNNF; |
| 160 APNNPPNPNF; | 161 BPNPPPPNNF; | 162 BNNPPPPPPF; | 163 BPPNPPNPPF; |
| 164 BNNPPPPNNF; | 165 BPPNPPNNPF; | 166 APPPPNNPNF; | 167 APPNPPNNNF; |
| 168 BNNNPNPPNF; | 169 BNNNNPPPNF; | 170 BNPPPPNPNF; | 171 BNPNNPNPNF; |
| 172 PPNPPPPNNF; | 173 BNPNNNNNPF; | 174 BNNPNPNNPF; | 175 BNPNNPNPNF; |
| 176 BNNPNNPPNF; | 177 BNPNNPNPPF; | 178 APPNPPPNPF; | 179 APPPPPNPNF; |
| 180 APNPPPPNNF; | 181 BNNPPPPPPF; | 182 BNNPNPNNNF; | 183 PPNPPPPNNF; |
| 184 BNPNPNNNNF; | 185 ANMPNNPPPF; | 186 APNPPPPNNF; | 187 BNPNPNNNNF; |
| 188 APPNPPNPPF; | 189 BNNPPNPPNF; | 190 BPPNPPPNPF; | 191 APPPPNPNPF; |
| 192 APPNPPNNPF; | 193 APPNPPPPPF; | 194 BPPNPPNNNF; | 195 ANNPNPPPNF; |
| 196 BNNNPPPNPF; | 197 APPNPNPPPF; | 198 APPNNPPPPF; | 199 ANNPNPPPPF; |
| 200 APPPNPPPNF; | 201 BNNNNNNPNF; | 202 HNPNNNPNPF; | 203 APPPNNPPNF; |
| 204 BNNPPNPNNF; | 205 BPPNPNPPNF; | 206 BNNNPNPNPF; | 207 BNNNNPNPPF; |
| 208 BPPPNPNPPF; | 209 BNNNNNNPNF; | 210 BNNNNPNPPF; | 211 APPPNNNPPF; |
| 212 BNNPNNPPPF; | 213 BNPNPPNPNF; | 214 BPNPPPPNNF; | 215 BNNNPPNNPF; |
| 216 BNNNNNPPPF; | 217 BPPPNNNPPF; | 218 BNNNNPPPNF; | 219 BNNPNNNPNF; |
| 220 BNPPPPNPNF; | 221 BPPPNPNPPF; | 222 BNNNPPPNPF; | 223 PNNPNNNNNF; |
| 224 BPNPPPPNNF; | 225 BNNNPPNNPF; | 226 BPPNPNPNPF; | 227 BPPPPPPPPF; |
| 228 BPPNPNPNNF; | 229 BNNNPNPPNF; | 230 BPPNPPPNNF; | 231 BNNNPPPPNF; |
| 232 BPPNPPNNNF; | 233 BNNPNPPPPF; | 234 BNNNPPPNPF; | 235 BPPPNPPPNF; |
| 236 BNNNPNPNNF; | 237 BNNPNPPPNF; | 238 BNNNPPPNPF; | 239 BPNPPPPNNF; |
| 240 BNNPPNPNNF; | 241 BNNNNNNPPF; | 242 BNNNNPPPNF; | 243 PNPPPPPNNF; |
| 244 BPPPNPPNPF; | 245 BNNPNNNNNF; | 246 BNPNNNPNNF; | 247 BNPNPPNPPF; |
| 248 BNPPNPNNNF; | 249 APPPNPPNPF; | 250 BNNNPPNPPF; | 251 BPNPPPPNNF; |
| 252 PNNPNNNNNF; | 253 APPNPPNNNF; | 254 BNNNPPPNPF; | 255 BNNPPPPPPF; |

The improvements in performance of the system of this embodiment wherein the individual net weights are determined by averaging as opposed to the initial embodiment wherein the net weights are determined by the absolute position of the reticle assembly and thus by a non-averaging technique are many. First, small random mechanical shocks to the scale may result in movement of the weighing platform by an amount sufficient to pass the next nearest incremental point of weight transition which will cause the non-averaging system to alter the displayed net weight, price, etc. to another value and will not return to the proper reading until a subsequent group of readings are read at the original value. Because the shocks have a duration in time which is short compared to the averaging period, and since the scale will be predominantly at the correct position, the averaging system diminishes the effect of the shocks to such a degree that the shocks must be two orders of magnitude times larger before they will alter the display. Thus, once the scale comes nominally to rest and a final net weight is provided, the final net weight is less likely to change.

If the scale is resting on a surface which is subject to continuous uniform vibration, such as a refrigeration unit, the non-averaging system would seize on and display alternate readings being read by the encoder, even though the scale may have been predominantly at a nominal value and only occasionally reach another value. The averaging system of this embodiment determines accurately the most correct of the readings and displays that value.

Lastly, the system of this embodiment is faster in terms of the amount of time required in reaching the correct final value. As previously explained, the platform goes through a number of essentially symmetrical damped oscillations about the platform position corresponding to the final correct weight as the platform comes to rest. Because the system of this embodiment takes the average of one hundred gross weight samples during each one-third second interval, it is able to anticipate the final rest value.

The weighing and computing system just described for FIGS. 3–13 applies particularly to a weighing and computing system which operates within the English system. As previously explained, each pulse counted by the up/down counter corresponds to one one-hundredth of a pound. The weighing and computing system of the present invention is easily converted for metric use by simply adding a divide by two counter to the encoder interface of FIG. 5 so that each pulse corresponds to five grams. Additionally, the multiplex system of FIG. 7 would be modified to effectively displace the decimal point of the weight display by one decimal place. Also, a recalibration of the resistant is required to account for the difference in weight between 0.1 lbs and five grams.

While a particular embodiment of the invention has been shown and described, modifications may be made, and it is intended in the appended claims to cover all such modifications as may fall within the true spirit and scope of the invention.

We claim:

1. A weighing and computing system of the type which determines a net weight and net price for each commodiy in a series of commodities to be weighed and a total net price for the entire series of commodities, said system comprising:
   a weighing mechanism including a platform upon which commodities to be weighed are placed for providing reference and gross weight signals responsive to the load on said platform;
   unit price means selectively operable for providing a read signal corresponding to a unit weight price for each commodity to be weighed;
   reference weight memory means for storing said reference weight signals developed by said weighing mechanism, said reference weight signals corresponding to the total load on the platform immediately prior to the weighing of the next commodity in the series;
   gross weight memory means responsive to said gross weight signals developed by said weighing mechanism for storing said gross weight signals, said gross weight signals corresponding to said reference weight plus the weight of the next commodity in the series placed on said platform;
   means for determining the difference between said gross weight signals and said reference weight signals to provide a net weight for said next commodity in the series of commodities;
   means for multiplying said net weight by said rate signal for providing a net price for each of said commodities in the series;
   net price accumulating means for accumulating said net prices; and
   display means coupled to said net price accumulating means for displaying the sum total of said net prices.

2. A weighing and computing system for determining the total net price of a series of commodity items including items to be weighed for determining individual net prices and items of fixed net price which are not to be weighed, said system comprising:
   a weighing mechanism including a platform upon which a commodity item to be weighed is placed for providing reference and gross weight signals responsive to the load on said platform;
   unit price means selectively operable for providing a rate signal corresponding to a unit weight price for a commodity to be weighed or an item net price signal for a commodity of fixed net price;
   reference weight memory means for storing said reference weight signals developed by said weighing mechanism, said reference weight signals corresponding to the total load of all previous commodities in the series which have been weighed;
   gross weight memory means responsive to said gross weight signals developed by said weighing mechanism for storing said gross weight signals, said gross weight signals corresponding to the total load of all said previous commodities weighed and the load of the next commodity in the series being weighed;
   means for determining the difference between said gross weight signals and said reference weight signals to provide a net weight for each commodity to be weighed in the series of commodities;
   means responsive to said weight difference determination for multiplying said net weight by said rate signals for providing a net price for each of said commodity items weighed in the series;
   net price accumulating means for accumulating said net prices; and
   display means coupled to said net price accumulating means for displaying the sum total of said net prices.

3. A digital weighing and computing system of the type which determines a net weight and net price for each commodity weighed in a series of commodities to be weighed, and a total net price of all of the commodities in the series, said system comprising:
   a weighing mechanism including a weighing platform upon which commodities to be weighed are placed and an encoder for providing electrical pulses responsive to the load on said platform;
   a counter for counting said pulses;
   reference weight memory means coupled to said counter for storing the number of a first set of said pulses, the number of said first set of pulses corresponding to a reference weight;
   gross weight memory means coupled to said counter for storing a second set of said pulses corresponding to the gross number of said pulses indicative of the gross weight on said platform;
   subtracting means coupled to said reference weight memory and to said gross weight memory for determining the difference in number between said second set of pulses and said first set of pulses to thereby provide a net weight indication signal indicative of the net weight of the commodity being weighed;
   unit price means selectively operable for providing a rate signal corresponding to a unit weight price for a commodity being weighed;
   multiplying means coupled to said subtracting means and to said unit price means for multiplying said net weight signal by said unit weight price signal for providing a net price for the commodity being weighed;
   net price accumulating means coupled to said multiplying means for accumulating the net prices; and
   display means coupled to said net price accumulating means for displaying the sum total of all said net prices.

4. A system in accordance with claim 3 further comprising means responsive to said subtracting means for detecting when the net weight is zero and for transferring said unit rate signal to said net price accumulating means responsive to the zero net weight detection, whereby said system accumulating means accumulates net prices of commodities which must be weighed for determining net price and commodities of fixed net price which are not to be weighed.

5. A system in accordance with claim 4 further including means responsive to said multiplying means for disabling said unit price means once said multiplying means provides a net price for a commodity being weighed.

6. A system in accordance with claim 4 wherein said unit price means comprises a keyboard including a plurality of keys, wherein said unit weight prices are selected by the depression of one or more of said keys, and wherein said system further comprises a unit price memory for storing said rate signals and an interdigit unit price timer for clearing a selected unit price from said unit price memory when the time between the depression of two consecutive keys exceeds a predetermined time interval.

7. A system in accordance with claim 4 further comprising means for generating a selected reference weight signal to be stored in said reference weight memory means comprising a keyboard which includes a plurality of keys, wherein said desired reference weight signal is generated by the depression of one or more of said keys, and wherein said reference weight generator includes an interdigit timer for clearing a selected reference weight from said reference weight memory when the time between the depression of two consecutive keys exceeds a predetermined time interval.

8. A system in accordance with claim 4 wherein said system also includes means for detecting a zero count in said counter for generating a zero count signal when said counter contains a zero count and means responsive to said absolute zero count signal, said subtracting means and said multiplying means for clearing said reference weight memory, said unit price means and said display upon the occurrence of said zero count signal after said multiplying means provides a net price or after said subtracting means provides a net weight indication signal corresponding to a positive net weight.

9. A system in accordance with claim 4 further comprising a multiplex system and wherein said counter is coupled to said reference weight memory means and said gross weight memory by said multiplex system.

10. A system in accordance with claim 9 wherein said display means is coupled to said net price accumulator by said multiplex system.

11. A system in accordance with claim 4 wherein said subtracting means determines the difference in number between said second set of pulses and said first set of pulses at a periodic rate to thereby provide a succession of said net weight indicative signals and wherein said multiplying means includes means responsive to said subtracting means providing a predetermined number of net weight indicative signals in succession which indicate the same net weight for automatically causing said multiplying means to multiply the net weight provided in succession by said unit weight price signal for providing said net price for the commodity being weighed.

12. A system in accordance with claim 11 wherein said predetermined number is two.

13. A system in accordance with claim 11 wherein said display means includes a net weight display and wherein said net weight display displays said net weights at a rate less than said periodic rate.

14. A system in accordance with claim 11 further comprising means for causing said display to display the maximum net weight provided by said subtracting means and means for causing said multiplying means to utilize said maximum net weight for determining said net prices.

15. A system in accordance with claim 4 wherein said display means further includes means for displaying the net weight of the commodity being weighed, wherein said subtracting means continuously provides net weight signals at a first rate and wherein said system additionally includes means for causing said display means to display net weights at a second rate.

16. A system in accordance with claim 15 wherein said second rate is less than said first rate.

17. A weighing and computing system of the type which determines a net weight and net price for a commodity to be weighed, said system comprising:
a weighing mechanism including a platform upon which commodities to be weighed are placed for providing a reference weight signal and periodically recurring gross weight signals responsive to the load on said platform;
unit price means selectively operable for providing a rate signal corresponding to the unit weight price for the commodity to be weighed;
reference weight memory means for storing said reference weight signal developed by said weighing mechanism;
gross weight memory means responsive to said gross weight signals developed by said weighing mechanism for accumulating said periodic gross weight signals during predetermined time intervals;
means for dividing said accumulated gross weight signals by the number of gross weight signals accumulated during each said predetermined time interval for providing average gross weight signals spaced apart in time by said predetermined time intervals;
means for determining the difference between said average gross weight signals and said reference weight signal to provide net weight signals;
final net weight detecting means responsive to said net weight signals for detecting when a predetermined number of said net weight signals represent the same net weight as a final net weight;
means responsive to said final net weight detecting means for multiplying said final net weight by said rate signal for providing a net price of the commodity; and
display means coupled to said multiplying means for displaying the net price of the commodity.

18. A system in accordance with claim 17 further comprising means responsive to said multiplying means for disabling said unit price means once said multiplying means provides the net price for the commodity.

19. A system in accordance with claim 18 wherein said unit price means comprises a keyboard including a plurality of keys, wherein said unit weight price is selected by the depression of said keys, and wherein said system further comprises a unit price memory for storing said rate signal and an interdigit unit price timer for clearing a selected unit price from said unit price memory when the time between the depression of two consecutive keys exceeds a predetermined time interval.

20. A system in accordance with claim 17 further comprising means for generating a selected reference weight signal to be stored in said reference weight memory comprising a keyboard which includes a plurality of keys, wherein said desired reference weight signal is generated to the depression of one or more of said keys, and wherein said reference weight generator includes an interdigit timer for clearing a selected reference weight from said reference weight memory when the time between the depression of two consecutive keys exceeds a predetermined time interval.

21. A system in accordance with claim 17 wherein said display means comprises a net weight display, wherein said net weight signals are provided at a periodic rate, and wherein said system includes means for causing said net weight display to display the instantaneous net weights at a rate which is less than said periodic rate.

22. A weighing and computing system of the type which determines a net weight and net price for each commodity in a series of commodities to be weighed and a total net price for the entire series of commodities, said system comprising:
a weighing mechanism including a platform upon which commodities to be weighed are placed for providing reference weight signals and periodically occurring gross weight signals responsive to the load on said platform;
unit price means selectively operable for providing a rate signal corresponding to a unit weight price for each commodity to be weighed;
reference weight memory means for storing said reference weight signals developed by said weighing mechanism, said reference weight signals corresponding to the total load on the platform immediately prior to the weighing of the next commodity in the series;
gross weight memory means responsive to said gross weight signals developed by said weighing mechanism for accumulating a given number of said gross weight signals during predetermined time intervals, said gross weight signals corresponding to said reference weight plus the weight of the next commodity in the series placed on said platform;
means for dividing said accumulated gross weight signals by the given number of gross weight signals accumulated during each said predetermined time interval for providing average gross weight signals spaced apart in time by said predetermined time intervals;
means for determining the difference between said average gross weight signals and said reference weight signals to provide net weight signals;
final net weight detecting means responsive to said net weight signals for detecting when a predetermined number of said net weight signals represent the same net weight as a final net weight;
means responsive to said final net weight detecting means for multiplying said final net weight by said rate signals for providing a net price for each of said commodities in the series;
net price accumulating means for accumulating said net prices; and
display means coupled to said net price accumulating means for displaying the sum total of said net prices.

23. A weighing and computing system for determining the total net price of a series of commodity items including items to be weighed for determining individual net prices and items of fixed net price which are not to be weighed, said system comprising:
a weighing mechanism including a platform upon which a commodity item to be weighed is placed for providing reference weight signals and periodically occurring gross weight signals responsive to the load on said platform;
unit price means selectively operable for providing a rate signal corresponding to a unit weight price for a commodity to be weighed or an item net price signal for a commodity of fixed net price;
reference weight memory means for storing said reference weight signals developed by said weighing mechanism, said reference weight signals corresponding to the total load of all previous commodities in the series which have been weighed;
gross weight memory means responsive to said gross weight signals developed by said weighing mechanism for accumulating a given number of said gross weight signals during predetermined time intervals, said gross weight signals corresponding to the total load of all said previous commodities weighed and the load of the next commodity in the series being weighed;
means for dividing said accumulated gross weight signals by the given number of gross weight signals accumulated during each said predetermined time interval for providing average gross weight signals spaced apart in time by said predetermined time intervals;
subtracting means for determining the difference between said average gross weight signals and said reference weight signals to provide net weight signals for each commodity to be weighed in the series of commodities;
final net weight detecting means responsive to said net weight signals for detecting when a predetermined number of said net weight signals represent the same net weight as a final net weight;
means responsive to said final net weight detecting means for multiplying said final net weight by said rate signals for providing a net price for each of said commodity items weighed in the series;
net price accumulating means for accumulating said net prices; and
display means coupled to said net price accumulating means for displaying the sum total of said net prices.

24. A system in accordance with claim 23 further comprising means responsive to said subtracting means for detecting when the net weight is zero and for transferring said unit rate signal to said net price accumulating means responsive to the zero net weight detection, whereby said system accumulating means accumulates net prices of commodities which must be weighed for determining net price and commodities of fixed net price which are not to be weighed.

25. A system in accordance with claim 24 further including means responsive to said multiplying means for disabling said unit price means once said multiplying means provides a net price for a commodity being weighed.

26. A system in accordance with claim 23 wherein said unit price means comprises a keyboard including a plurality of keys, wherein said unit weight prices are selected by the depression of one or more of said keys, and wherein said system further comprises a unit price memory for storing said rate signals and an interdigit unit price timer for clearing a selected unit price from said unit price memory when the time between the depression of two consecutive keys exceeds a predetermined time interval.

27. A system in accordance with claim 23 further comprising means for generating a selected reference weight signal to be stored in said reference weight memory means comprising a keyboard which includes a plurality of keys, wherein said desired reference weight signal is generated by the depression of one or more of said keys, and wherein said reference weight generator includes an interdigit timer for clearing a selected reference weight from said reference weight memory when the time between the depression of two consecutive keys exceeds a predetermined time interval.

28. A system in accordance with claim 23 further comprising a multiplex system and wherein said weighing mechanism is coupled to said reference weight memory means and said gross weight memory by said multiplex system.

29. A system in accordance with claim 28 wherein said display means is coupled to said net price accumulator by said multiplex system.

30. A system in accordance with claim 23 wherein said display means includes a net weight display, wherein said net weight signals are provided by said subtracting means at a periodic rate, and wherein said system further includes means causing said net weight display to display said net weights at a rate less than said periodic rate.

31. A system in accordance with claim 23 wherein said predetermined number is two.

32. A system in accordance with claim 23 wherein said display means further includes means for displaying the net weight of the commodity being weighed, wherein said subtracting means continuously provides net weight signals at a first rate and wherein said system additionally includes means for causing said display means to display net weights at a second rate.

33. A system in accordance with claim 32 wherein said second rate is less than said first rate.

* * * * *